United States Patent
Steinich

(10) Patent No.: US 6,561,451 B1
(45) Date of Patent: May 13, 2003

(54) MEASURING CABLE TRAVEL SENSOR WITH LONGITUDINAL DRIVE FOR THE CABLE DRUM

(75) Inventor: Klaus-Manfred Steinich, Poering (DE)

(73) Assignee: ASM Automation Sensorik Messtechnik GmbH, Unterhaching (DE)

( * ) Notice: Subject to any disclaimer, the term of this patent is extended or adjusted under 35 U.S.C. 154(b) by 0 days.

(21) Appl. No.: 09/468,926

(22) Filed: Dec. 22, 1999

(30) Foreign Application Priority Data

Dec. 22, 1998 (DE) .......................... 198 59 445

(51) Int. Cl.⁷ .......................... G01B 3/00; G01B 5/02; B66D 1/39
(52) U.S. Cl. .................... 242/563.2; 242/396; 242/397; 242/397.2; 33/700; 33/754
(58) Field of Search ............... 242/563.2, 396, 242/397, 397.2, 912; 33/700, 754, 761, 756, 755, 762, 763; 73/865.9

(56) References Cited

U.S. PATENT DOCUMENTS

| | | | | |
|---|---|---|---|---|
| 1,811,945 A | * | 6/1931 | Lange | 242/397 |
| 1,947,392 A | * | 2/1934 | Guntermann et al. | 242/397 |
| 2,809,435 A | * | 10/1957 | Nicolsen et al. | 73/152.02 X |
| 3,167,865 A | * | 2/1965 | Steinberg | 33/754 |
| 4,443,888 A | * | 4/1984 | Cutler | 378/151 |
| 5,145,038 A | * | 9/1992 | Kuwahera | 188/158 |
| 5,160,972 A | * | 11/1992 | Walters et al. | 356/32 |
| 6,154,975 A | * | 12/2000 | Steinich | 33/756 |
| 6,241,453 B1 | * | 6/2001 | Upmeyer | 414/667 |

FOREIGN PATENT DOCUMENTS

| | | | | |
|---|---|---|---|---|
| DE | 2903096 A1 | * | 7/1980 | G01F/23/00 |
| DE | 3539884 A1 | | 5/1987 | 242/129 |
| DE | 3621234 A1 | * | 1/1988 | 164/483 |
| DE | 29716524 U1 | * | 2/1998 | B66D/1/39 |
| EP | 69104261 T2 | | 3/1995 | H02K/49/10 |
| EP | 778239 A1 | * | 6/1997 | B66D/1/39 |
| EP | 1057767 A1 | * | 12/2000 | G01B/3/10 |
| GB | 2085841 A | * | 5/1982 | 242/396 |
| JP | 6-183684 | * | 7/1994 | G01B/5/02 |

OTHER PUBLICATIONS

WO 99/51513, Front page and PCT Source Report inventor Upmeyer "Satellite Vehicle for moving Pallet Units in and out of storage with transportation vehicles",Oct. 1999.*
Derwent–Acc–No: 2000–138125, abstract & clipped image of DE19839027 U inventor Steinich "Displacement sensor for measuring cable for determining precise position of object: Los casing provided by extruded profile enclosing rotation angle sensor, reverse rotation spring and cable drum for measuring cable". Feb. 2000.*
Derwent–Acc–No; 2001–063399 abstract and clipped image of EP 1102030 A1 inventor Steinich "Displacement sensor with measuring cable comprise a housing which is provided with at least two plane outside surfaces oriented at a right angle relative to one another", May–2001.*

* cited by examiner

Primary Examiner—Thomas P. Noland
(74) Attorney, Agent, or Firm—Crowell & Moring LLP

(57) ABSTRACT

A measuring cable travel sensor includes a housing and a cable drum which is arranged in the housing rotatably and longitudinally displaceably in the longitudinal direction of the travel sensor. The measuring cable is guided into and out of the housing through a stationary cable guide. The travel sensor has a longitudinal drive for displacing the cable drum, including a spindle drive comprising a screwthreaded spindle and a spindle nut screwable thereon. The longitudinal drive has an additional transmission for transmitting rotary movement of the cable drum to the spindle drive for producing cable drum displacement.

53 Claims, 30 Drawing Sheets

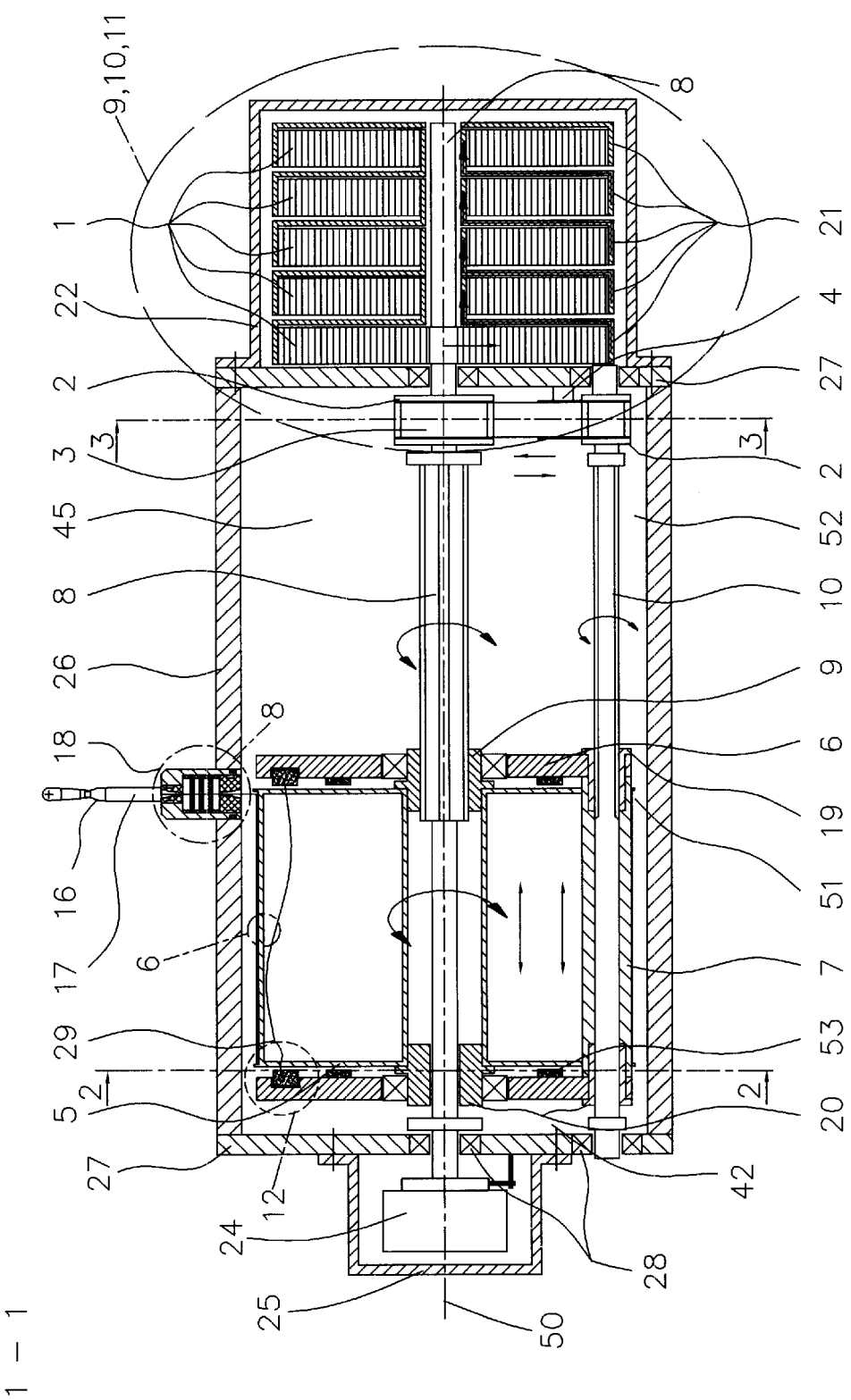

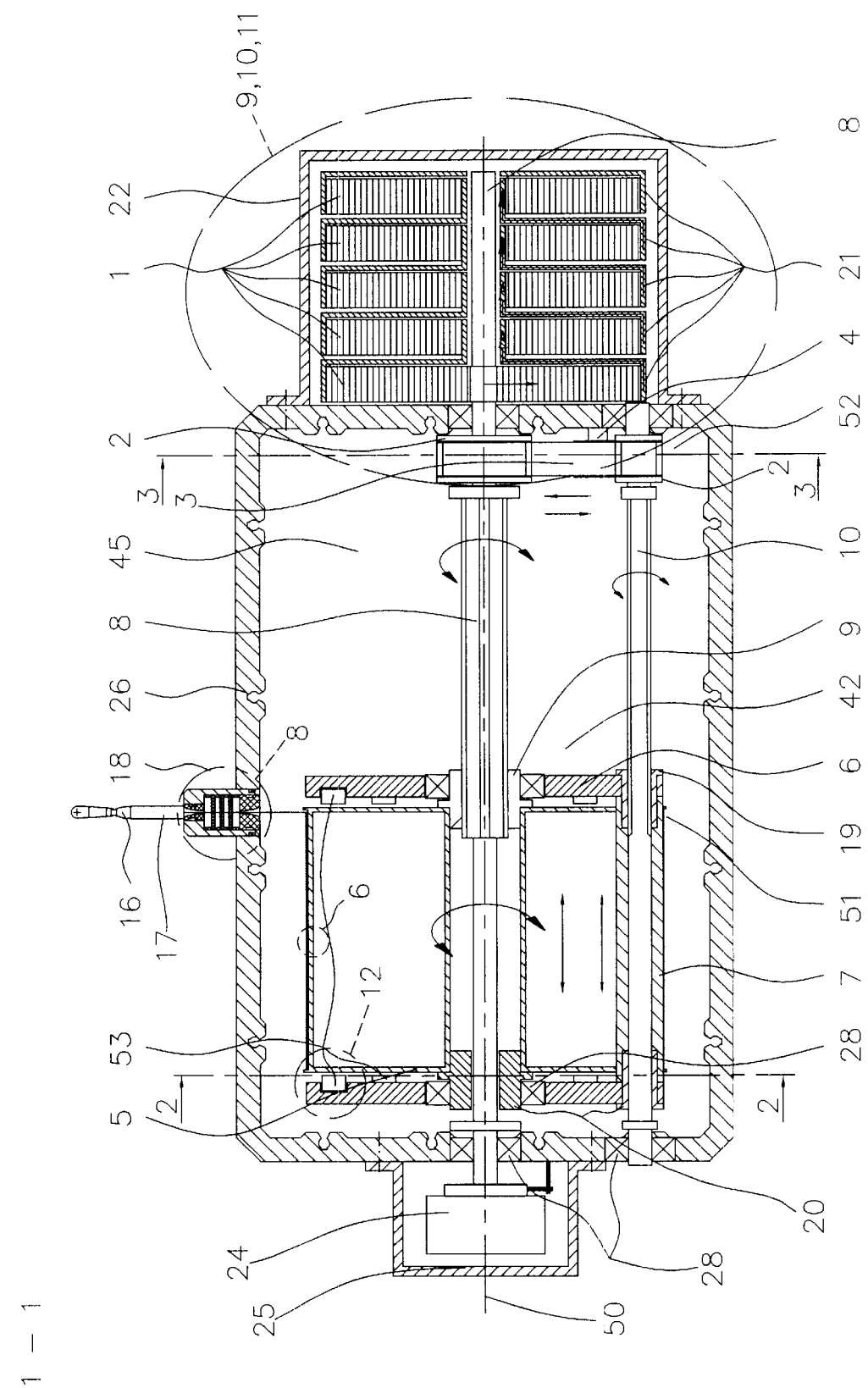

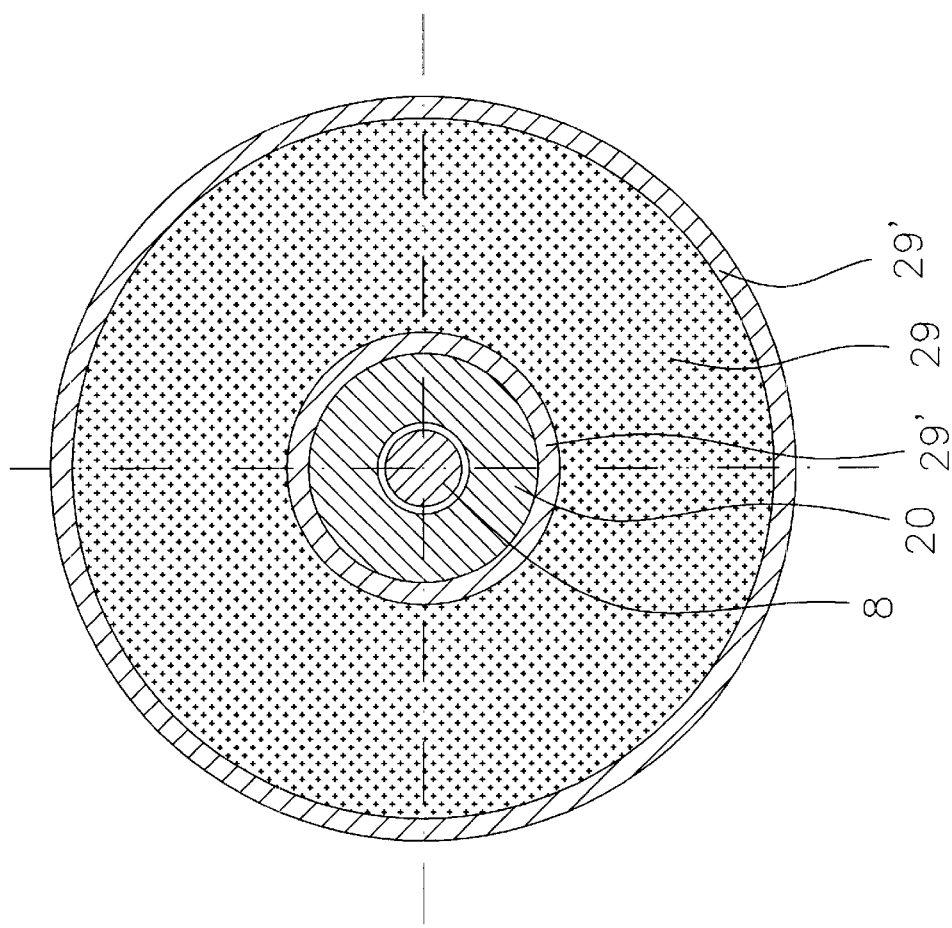
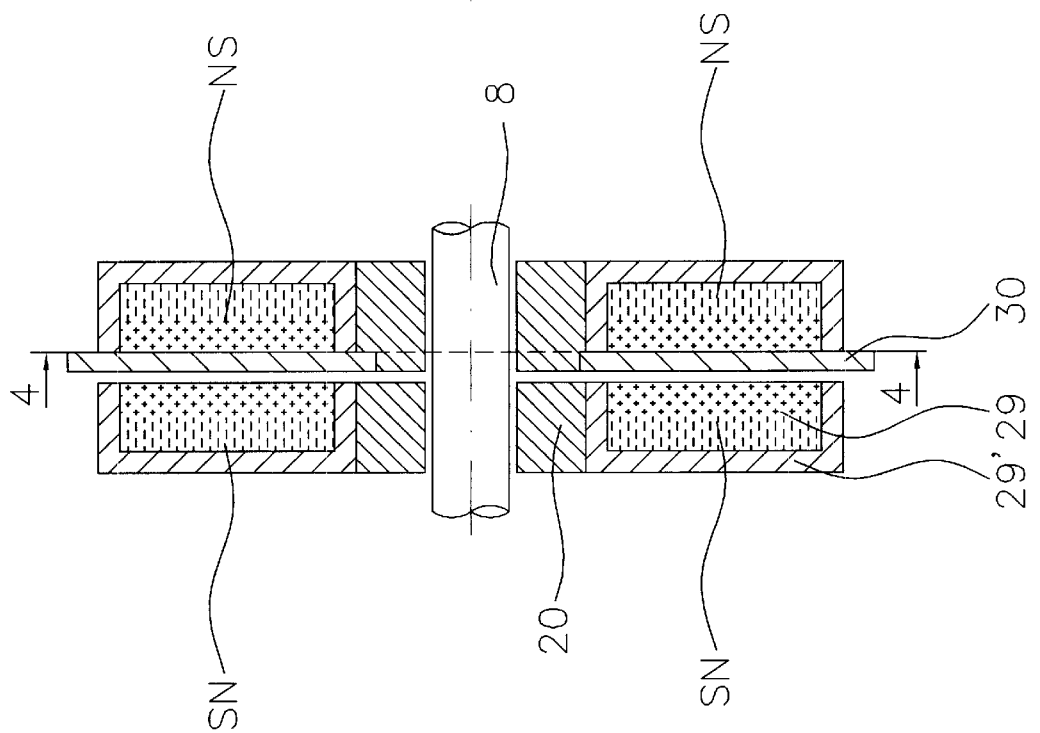

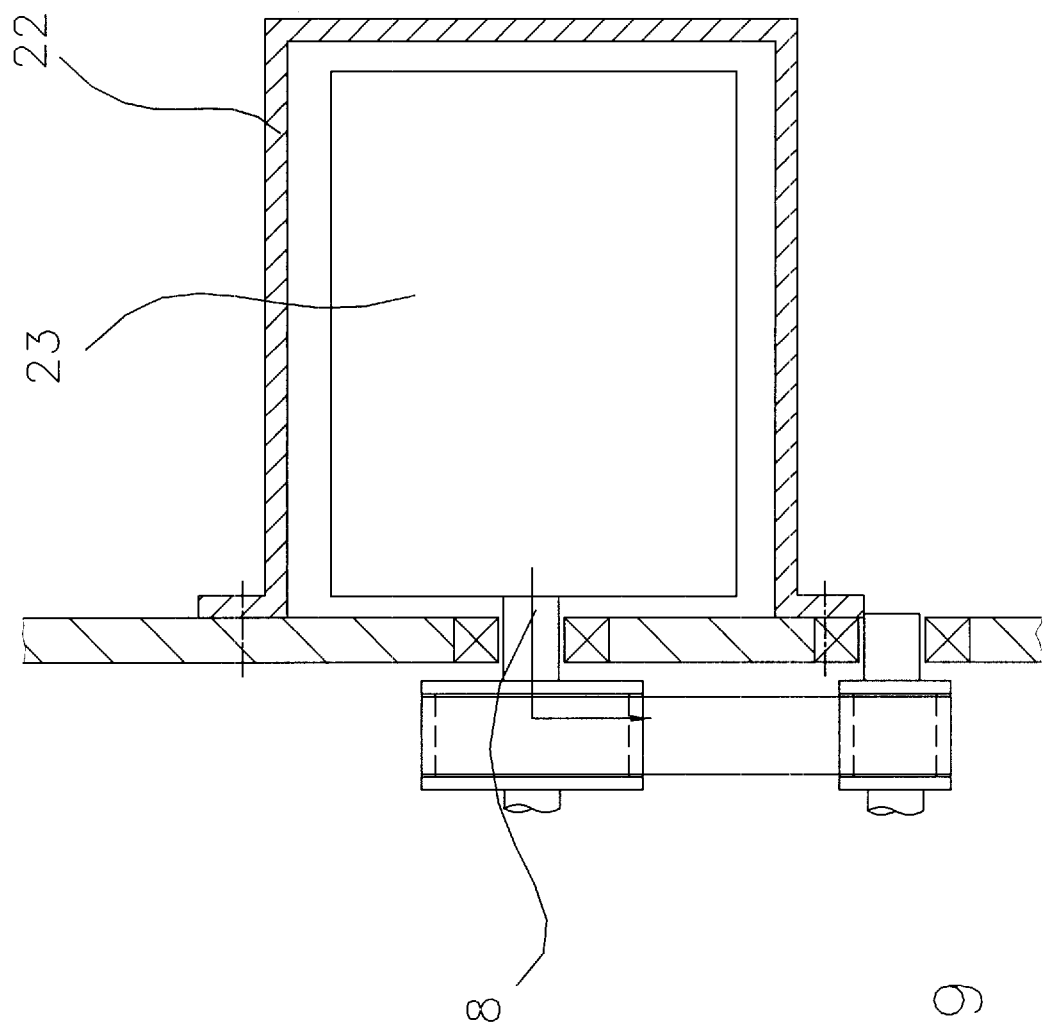

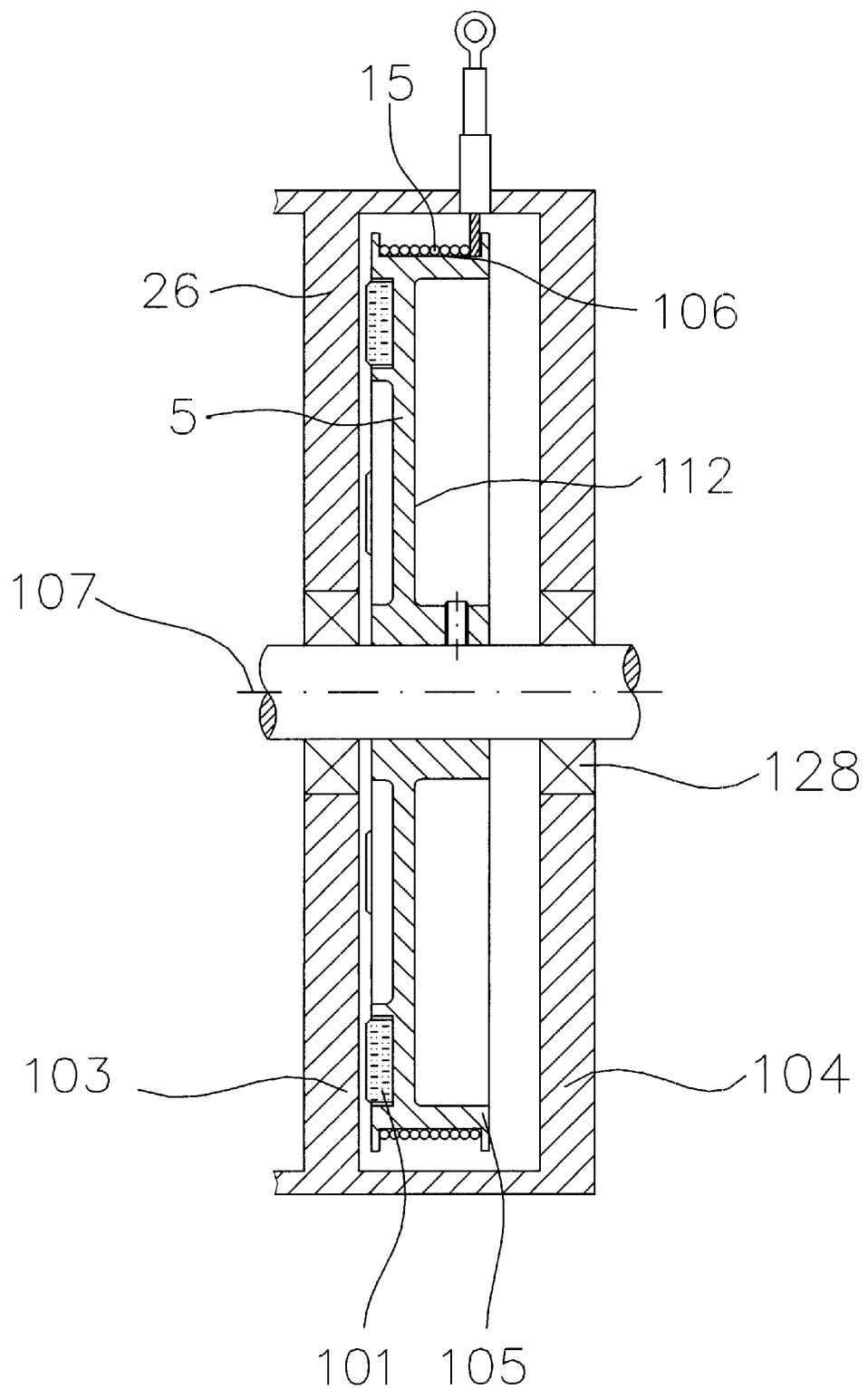

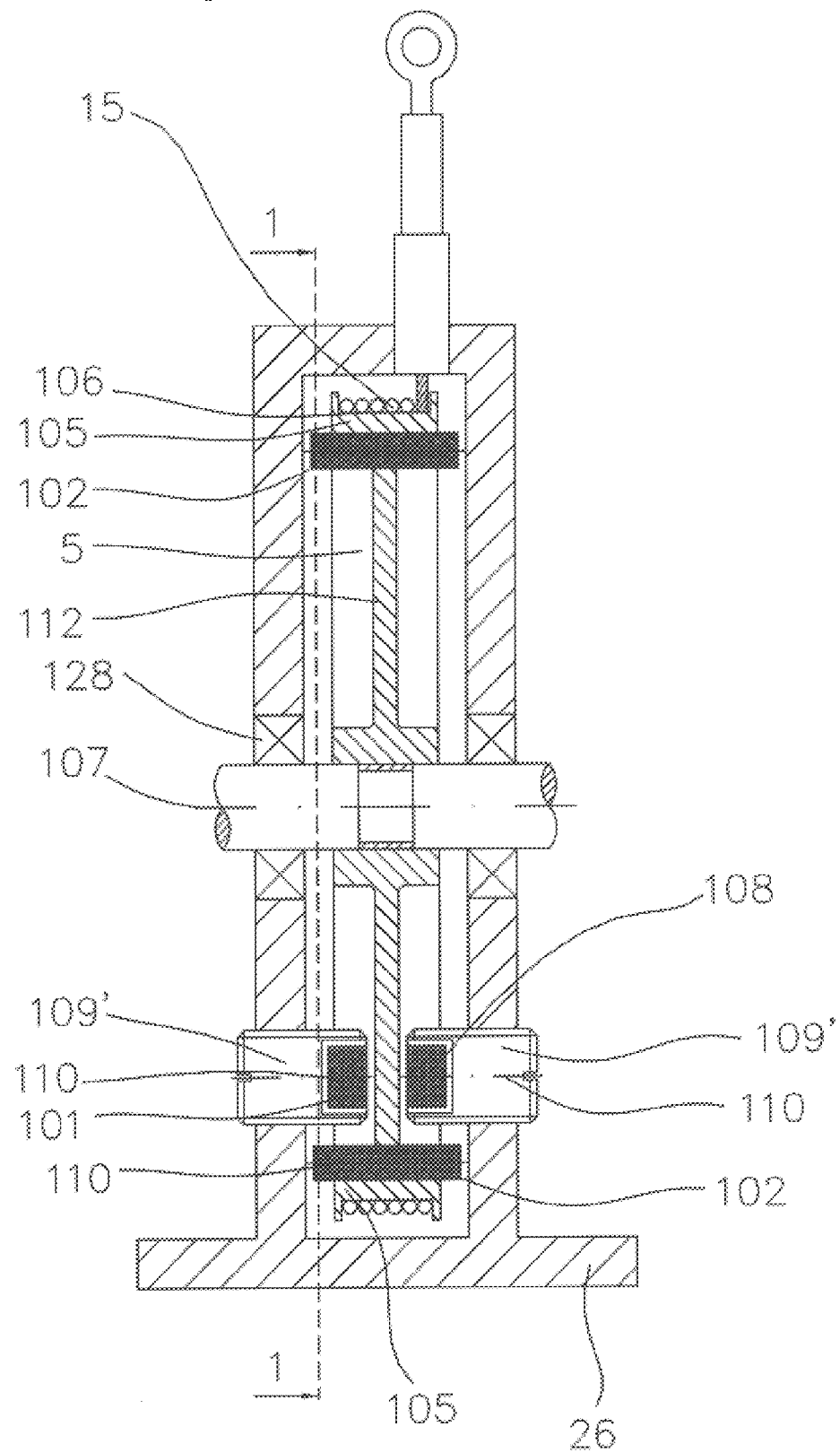

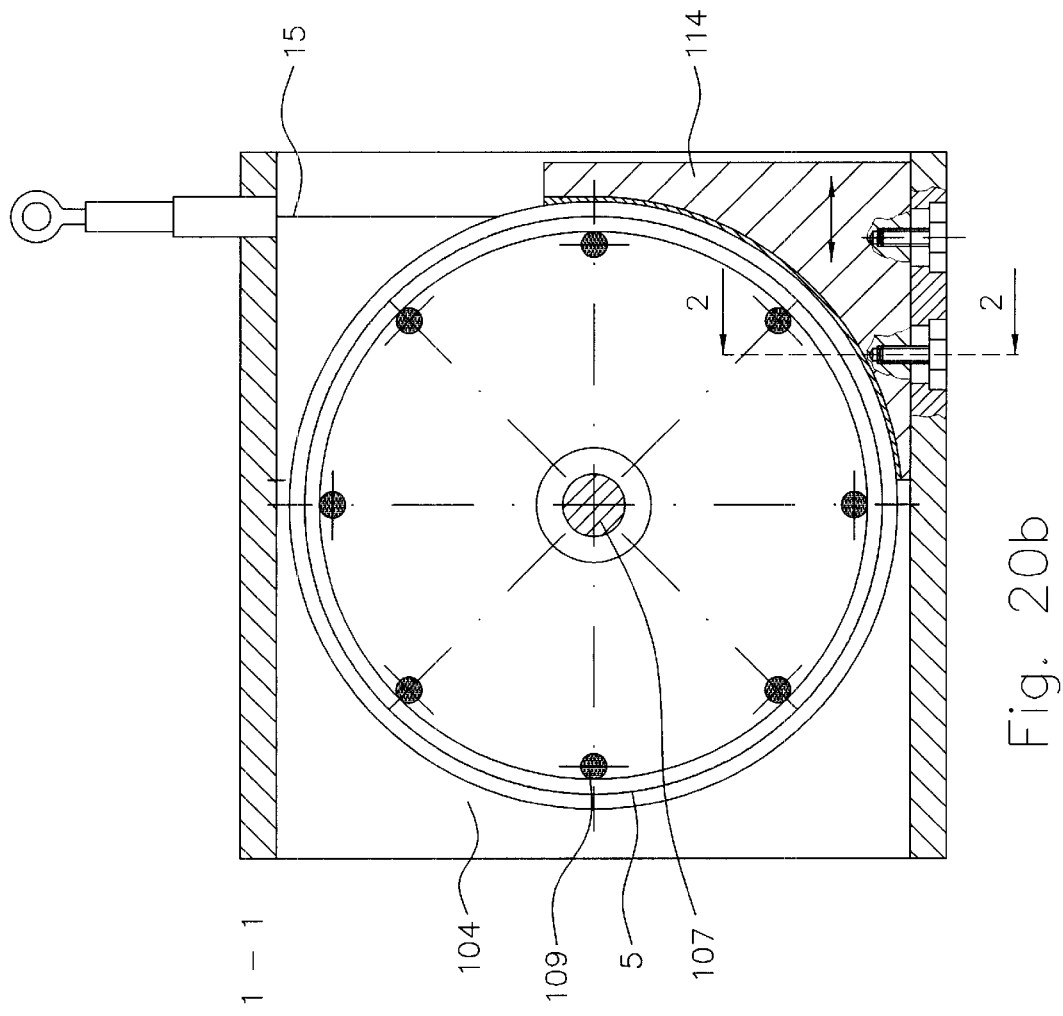
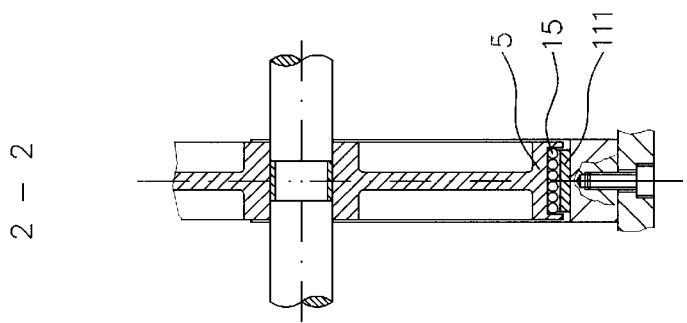
Fig. 20b
Fig. 20a

MEASURING CABLE TRAVEL SENSOR WITH LONGITUDINAL DRIVE FOR THE CABLE DRUM

BACKGROUND AND SUMMARY OF THE INVENTION

1. Field of the Invention

The invention concerns a measuring cable travel sensor and more particularly a measuring cable travel sensor having a longitudinal drive for displacement of the cable drum.

2. Background of the Invention

Measuring cable travel sensors occur in many different configurations for example for determining the precise position of a given component which in particular can move over considerable travel distances, for example the cabin of an elevator. A typical measuring cable travel sensor of that kind and for that purpose has a pull element such as a measuring cable which is wound on a cable drum which is biassed in the cable winding-on direction. The free end of the measuring cable is connected to that component whose position is to be determined, for example as mentioned above an elevator cabin. The prestressing force for urging the cable drum in the winding-on direction is produced for example by way of a flat spiral spring which for example is arranged coaxially with respect to the cable drum and is non-rotatably connected thereto.

The cable drum is also typically coupled to a detection unit for recording the revolutions or angular distances through which the cable drum passes in the winding-on or unwinding direction, and which in addition by way of a suitable electronic evaluation system determines the length of the pull element or measuring cable which has been drawn off the cable drum.

In order to simplify that operation of determining the drawn-off length of the measuring cable and to ensure an accurate measurement result, the measuring cable is wound in only a single layer on the periphery of the cable drum, with the turns of the wound cable on the cable drum being disposed in axially juxtaposed relationship. As a result, one revolution of the cable drum will always correspond to exactly the same length of the pull element or measuring cable.

In order to ensure that the measuring cable is wound on to the drum in only a single layer and in order to prevent the measuring cable from jumping over on to the first layer to start to form a second layer there over when winding the measuring cable on to the cable drum, it is generally necessary to take suitable mechanical steps involving appropriate structure on the travel sensor to obviate this occurrence.

In that respect there is an additional difficulty insofar as such measuring cable travel sensors often have to be used in an adverse environment, for example involving a high level of fouling and contamination. For that reason the measuring cable travel sensor has to be disposed in a housing which affords sealing integrity, and the measuring cable which is passed out of the housing also has to be taken out of the housing by way of a cable guide passing through the wall of the housing, which also offers the greatest possible level of sealing integrity in relation to the cable.

In order to ensure that the measuring cable is wound on the cable drum in a neat and tidy fashion in a single layer, one possible way of achieving that is for the cable drum to be very short in its axial direction. If in addition the cable entrance is at a sufficient distance from the cable drum, then the measuring cable, on moving from the cable entrance to the cable drum, runs only at such a slight degree of angular deflection as to still be acceptable, and such an arrangement automatically causes the cable drum which is biassed in the winding-on direction to have the measuring cable wrap there around in only a single layer.

Even if the diameter of the cable drum is selected to be relatively large to provide a compensatory effect, that nonetheless entails a limitation in terms of the maximum possible length of the measuring cable. In addition, that affords a structural configuration which is very large in the radial direction, and a single revolution of the cable drum corresponds in that case to a relatively long peripheral length and thus a relatively long length of cable, so that the level of resolution of the measuring cable travel sensor is restricted in consequence.

If the above-indicated limitations give rise to the need for the cable drum to be of a substantially greater axial extent, then the cable entrance must be moved relative to the cable drum when the measuring cable is being wound on to or unwound from the cable drum, so that the cable entrance is disposed always substantially at the radial plane at which the measuring cable is being wound on to or unwound from the cable drum at that time. In that respect, and for that purpose, while it is possible for the cable entrance to be displaced relative to the cable drum which is arranged in axially fixed relationship in the housing, it is also possible to adopt the reverse arrangement.

At first view, it may admittedly be an easier course of action for the relatively small and light cable entrance to be adapted to be axially displaceable, rather than the rotatably mounted cable drum, but from the point of view of affording good sealing integrity for the measuring cable travel sensor with respect to its ambient conditions, a preferred arrangement is for cable guide means to be arranged fixedly on the housing, so that the measuring cable drum is axially displaceable relative thereto.

In that respect attention may be directed for example to U.S. Pat. No. 4,443,888 in which the measuring cable drum is rotatably mounted directly on a central screwthreaded spindle. The pitch of the screwthread on the spindle establishes the relationship between rotary movement and longitudinal displacement of the cable drum. The rotary movement of the cable drum is transmitted by way of an eccentric entrainment means to the return unit of the cable drum for urging it on the winding-on direction.

Reference may also be made to European patent No. 0 778 239 disclosing a screwthreaded spindle of a hollow configuration, wherein disposed in the interior of the hollow screwthreaded spindle in coaxial relationship therewith is a shaft, for example a splined shaft, on which the cable drum is arranged longitudinally displaceably but non-rotatably by way of one of its end plate portions, while the other end plate portion of the cable drum is in screwthreaded engagement with the male screwthread on the screwthreaded spindle. The longitudinal drive means in the form of the screwthreaded spindle on the one hand and transmission of the rotary movement of the cable drum to the rotary angle sensor and/or the return drive by means of the splined shaft on the other hand are thus disposed in the center of the cable.drum in mutually coaxial relationship.

A disadvantage with those structures however is that the degree of longitudinal displacement depends on the pitch of the screwthread on the screwthreaded spindle and the spindle nut co-operating therewith. If for example the travel sensor uses a measuring cable of relatively great thickness, for example because the tensile loading acting on the measuring cable is relatively high, then when the cable drum rotates, a greater degree of longitudinal displacement thereof is required than when using a thinner measuring cable.

In the above-mentioned conventional structures, in order to solve this problem the screwthreaded spindle and the spindle nut co-operating therewith must to be, exchanged, which entails complete dismantling of the measuring cable sensor, including fitting and thus, in the fitting operation the return device which in general is a flat shaped spring in the form of a spiral spring, must be again prestressed. This can scarcely be effected on site even by a specialized fitter, quite apart from the large amount of time that this necessarily entails.

SUMMARY OF THE INVENTION

An object of the present invention is to provide a measuring cable travel sensor adapted to provide for longitudinal displacement of the cable drum within its housing using a simple structure, wherein the relationship between rotary movement of the cable drum and longitudinal displacement thereof can be repeated and easily altered.

Another object of the present invention is to provide a measuring cable travel sensor with a longitudinally displaceable drum for adaptation to the position at which the measuring cable passes on to and off from, which affords in particular a very low-friction support configuration for the cable drum combined with a simple and inexpensive design configuration and easy travel sensor maintenance options.

Still another object of the present invention is to provide a measuring cable travel sensor with a longitudinally displaceable drum, which affords greater ease of and reliability in operation, enhanced measurement accuracy and simplicity of structure.

In accordance with the present invention the foregoing and other objects are attained by a measuring cable travel sensor comprising a housing and a cable drum which is arranged in the housing rotatably and longitudinally displaceably relative to the axis of rotation of the drum in the longitudinal direction thereof. The travel sensor further has a cable guide means for guiding the measuring cable, being arranged in fixed relationship with the housing. The travel sensor further includes a longitudinal drive means for displacement of the cable drum, comprising a spindle drive means including a screwthreaded spindle which is screwable relative to a spindle nut thereon. The longitudinal drive means has an additional transmission means for transmitting rotary movement of the cable drum to the spindle drive means.

Further in accordance with the principles of the present invention the foregoing and other objects of the invention are attained in a second aspect by a measuring cable travel sensor including a measuring cable and a cable drum having a winding cylinder with an external winding surface, for the measuring cable to be wound on to the external winding surface of the cable drum. The cable drum is mounted in a housing. The travel sensor further includes at least one retardation or braking magnet which is so arranged at a point that is non-rotatable with the cable drum that it has a magnetic retardation or braking action in contact-less manner in opposite relationship to the direction of winding-on rotation of the cable drum on the cable drum at an eccentric region of action thereon. At least in the region of action the cable drum includes electrically conductive material.

In accordance with the principles of the present invention the foregoing and other objects of the invention are attained in a third aspect by a measuring cable travel sensor including a measuring cable and a cable drum having a winding cylinder with an external winding surface, for the measuring cable to be wound on to the external winding surface of the cable drum. The cable drum is mounted in a housing. At least one retardation or braking magnet is eccentrically arranged on the cable drum in such a way that it has a retardation or braking effect magnetically in contact-less manner on the housing in the direction of rotation. The housing is of electrically conductive material at least in the region of action of the magnet.

In accordance with the principles of the present invention the foregoing and other objects of the invention are attained in a fourth aspect by a measuring cable travel sensor including a measuring cable and a cable drum having a winding cylinder with an external winding surface, for the measuring cable to be wound on to the external winding surface of the cable drum. The cable drum is mounted in a housing. The sensor further includes at least one holding magnet arranged at the cable drum radially within the external peripheral surface of the winding cylinder of the cable drum, for holding the measuring cable radially inwardly against said winding surface, wherein the measuring cable comprises magnetisable material.

In accordance with the principles of the present invention the foregoing and other objects of the invention are attained in a fifth aspect by a measuring cable travel sensor including a measuring cable and a cable drum having a winding cylinder with an external winding surface, for the measuring cable to be wound on to the external winding surface of the cable drum. The cable drum is mounted in a housing. The sensor further includes a sliding band, for example a band of textile material, more particularly a sliding band or band of other slidable, non-abrasive material, which is passed around at least a part of the external periphery of the external winding surface of the cable drum, which external winding surface is partially or entirely movable with the measuring cable, the band being passed around said winding surface at a small spacing and/or in dragging or frictional relationship at the external periphery of the winding with the measuring cable, while the spacing or the contact pressure of the band against the measuring cable winding is adjustable.

As will be noted from the description hereinafter of preferred embodiments of the present invention, in the first aspect thereof, the fact that the longitudinal drive for displacement of the cable drum along the direction of its axis of rotation not only comprises the spindle drive means but an additional transmission means that the additional transmission can be of such an arrangement and configuration that it is easily possible to make a change in the transmission effect and ratio of the additional transmission means. If the additional transmission means comprises for example a belt transmission such as a toothed belt transmission then the belt pulleys can be replaced by pulleys of a larger and/or smaller diameter as appropriate. If the transmission means comprises a gear transmission arrangement, then the relevant gears can be appropriately changed.

By virtue of the provision of a belt tensioner, in that case it is not even necessary for the belt such as a toothed belt also to be changed upon a change in the belt pulleys. Such an advantageous arrangement, which is readily accessible, is afforded if the screwthreaded spindle and the cable drum rotate about mutually parallel axes, and in that respect in particular are supported in end plate portions of the housing. In that respect preferably the shaft which also rotates with the cable drum is in the form of a central shaft and the cable drum is carried thereon non-rotatably but longitudinally displaceably, directly or indirectly.

Thus for example the cable drum could be rotatably supported in a carriage or slider which is non-rotatably arranged longitudinally displaceably on the central shaft.

Another option in this respect provides that the cable drum is admittedly longitudinally displaceably and non-rotatably mounted on the central shaft directly or by means of an intermediate portion which also rotates therewith, but it is nonetheless guided in the axial direction in a slider or carriage. The axial movement then only has to be transmitted to that slider or carriage, and not directly to the cable drum.

That affords in particular the advantage that the axial mounting arrangement for supporting the cable drum in the slider or carriage can be of a particularly low-friction configuration, for example by involving a contact-free mounting by means of magnets, more especially maintenance-free permanent magnets.

For that purpose, arranged in the end plate portions of the cable drum on the one hand and the oppositely directed surfaces of the slider or carriage on the other hand are magnets which are oriented axially, in respect of their polarity, for example annular magnets, best in coaxial relationship with the axis of rotation of the cable drum, being directed in opposite relationship with the same poles. As therefore at the two ends the magnets of the cable drum are repelled by the magnets of the carriage or slider, the cable drum is always automatically set to a central position and in contact-free relationship on both sides with respect to the carriage or slider in the axial direction.

The option of easily changing the transmission ratio affords in particular the possibility of so selecting the longitudinal displacement of the cable drum that the individual turns or windings of the measuring cable on the cable drum are applied to the cable drum in closely juxtaposed relationship but without making contact with each other, in such a way as to be adapted to the respective cable diameter, which can contribute to reducing the wear that the cable suffers on being wound on to and unwound from the cable drum.

Preferably besides the cable drum the longitudinal drive means, that is to say the spindle drive means and the additional transmission means, are accommodated in sealed relationship within the housing and more specifically in particular in the same internal space in the housing, and are thus protected from fouling and contamination from the ambient atmosphere. The central shaft and also the screwthreaded spindle are preferably supported in the end plate portions of the housing, while the housing preferably comprises one or more longitudinally extending shaped members, for example extrusion portions, which are closed by end plate portions to form the closed housing structure.

The end plate portions are screwed on to the shaped member or members at the ends thereof in a simple fashion by virtue of the shaped member or members being provided, in the internal surfaces thereof, with screw passages in the form of grooves which are open towards the inside of the respective shaped portion and which afford an undercut configuration and which are of an approximately round cross-section. Accordingly, self-tapping screws can be screwed into the ends of the screw passages of that round cross-section.

The return drive for the cable drum which is generally a flat spring in the form of a spiral spring or a plurality of flat springs of that kind which are arranged in axial succession, in the form of a whole flat spring cascade, are preferably arranged coaxially and more particularly directly on the central shaft, preferably outside the housing for the cable drum, in a housing cover portion which is to be separately fitted to the main housing. The same consideration applies, preferably in regard to the opposite end, to the central shaft for the rotary angle sensor for detecting the rotary and angular movements of the cable drum within the housing.

So that the measuring cable can traverse the entire axial length of the cable drum if required, the central shaft, in the interior of the housing, must enjoy an axial length of approximately double the axial extent of the cable drum.

When the cable drum is supported in a slider or sliding carriage, the bearings for the cable drum are disposed at a mutual spacing corresponding to the axial extent of the cable drum, while when the cable drum is screwed directly along a screwthreaded spindle, only the screwthreaded spindle can be supported, more specifically with a distance between its mountings which approximately corresponds to double the axial extent of the cable drum, in the end walls of the housing.

The cable entrance member which is arranged fixedly in the housing, by virtue of the displaceability of the cable drum, can readily be disposed axially in the center of the housing. The cable entrance member substantially comprises a generally cup-shaped main body with a through bore in the bottom thereof, the measuring cable passing centrally through the main body and the bore therein.

Arranged in the main body, in succession from the outside inwardly in relation to the housing in which the main body is fitted, are a damping element on the outward side for damping impingement there against of a connecting portion carried on the free end of the measuring cable, then a cable guide means of a material which is highly resistant to wear and thereafter at an axial spacing preferably a plurality of cable scraper members. The cable scraper members are preferably of a plate-like configuration and bear in close contact against the outside surface of the cable. The cable guide means is of a relatively large axial extent and has an opening which enlarges in a trumpet-like configuration from the inside outwardly.

Packings of grease or other material which have a sealing action and which absorb dirt and other contamination or fouling to prevent it from passing into the housing can be arranged between the individual scraper members. Arranged at the inwardly facing orifice of the main body is a further cable guide means which enlarges in a trumpet-like configuration towards the interior of the housing of the travel sensor.

In regard to the further aspects of the invention as outlined above, involving a retardation or braking magnet on the housing or the cable drum, as will further become apparent from the description hereinafter of preferred embodiments of the invention, it is possible to limit the speed of rotary movement of the cable drum when the measuring cable is winding there onto by the use of the contact-less magnetic braking assembly. The components involved in that structure are to comprise an electrically conductive material.

The braking moment can be generated between an eccentrically disposed region of the cable drum, preferably a region which is in the proximity of the external periphery thereof, and a stationary point which is thus non-rotatable with respect to the cable drum, for example a part of the housing of the cable drum.

As the measuring cable is wound on to the cable drum on the radially outwardly disposed peripheral surface thereof, the magnets are preferably oriented in a longitudinal direction, that is to say parallel to the axis of rotation of the cable drum, between two components which are adjacent to each other in that axial direction.

In such an arrangement, by virtue of the rotary movement of the cable drum, and irrespective of the spacing of the retardation or braking magnet relative to the component to be influenced thereby, an eddy current is firstly produced in the component which carries the retardation or braking magnet. The consequence of that eddy current is a magnetic field which is closed by way of the portion which is not in the magnetic field, thereby producing a braking moment.

Besides the strength of the magnet used, the braking action is determined to a very great extent by the spacing between the magnet and the component to be influenced thereby, and it is for that reason that this spacing should preferably be adjustable.

The respective component which is to be subjected to the influence of the braking magnet must comprise electrically conductive material, for example aluminum. When the magnet or magnets are arranged on the cable drum, that increases the inertial mass thereof, and that therefore affords the further aspect of the invention which entails arranging the braking magnet or magnets at a stationary point for example on the housing. That would also remove the compulsion for the provision of at least a pair of braking magnets on the cable drum, as a single magnet results in a cable drum unbalance, and that arrangement also makes available more space for example for fitting a magnet holder for adjustability of the air gap.

A consideration which is in favour of arranging the magnet or magnets on the cable drum however is the possibility that the magnet or magnets can be used at the same time as a holding magnet or magnets, thus providing a functionally combined unit.

In this respect, in this specification the term holding magnet is used to denote a magnet which is intended to prevent the measuring cable from climbing up or rising away from the winding surface formed by the external surface of the winding cylinder portion of the cable drum, insofar as the material of the measuring cable, which for this purpose is necessarily magnetisable, is drawn radially inwardly by magnetic force towards that winding surface. Accordingly holding magnets of that kind have to be disposed radially within the winding surface on the cable drum, and preferably therefore fixed on the inside of the winding cylinder which consists of a thin material, preferably in turn distributed over the periphery of the cable drum. In this case also the recommendation is for the axis of magnetisation of the magnet or magnets to be oriented parallel to the axis of rotation of the cable drum, that is to say, it is recommended to provide a bar magnet, in particular a permanent magnet, which extends in the longitudinal direction of the cable drum.

In both cases the magnetic force can be increased by the provision of pole shoes or pole pieces, that is to say involving close contact of iron materials against at least one outside of the magnet, in order thereby to reduce the level of magnetic losses. Preferably, the arrangement does not involve any covering by a pole piece in that direction in which the field lines are required to pass into or out of the magnet freely. Therefore, primarily cup-shaped pole pieces are preferred, which in the case of the retardation or braking magnet are directed with their open side towards the component to be influenced by the magnetic effect and which, in the case of the holding magnet, are directed with their open side radially outwardly towards the measuring cable.

It is also possible to achieve an increase in the level of retardation or braking force by using rare earth magnets, that is to say magnets with components of samarium, cobalt, neodymium and/or boron. In particular rare earth magnets of that kind can be used to produce disk-shaped magnets whose magnetisation axis extends in parallel relationship to the thickness of the disk through the disk and/or which in that case can be magnetised differently in a sector-like configuration.

Disk-shaped magnets of that kind can be disposed in the constricted conditions in terms of space of measuring cable travel sensors, more easily than elongate bar magnets.

In particular such disk-shaped magnets can be accommodated in the end of screwthreaded pins or bolts as magnet holders which, in the component carrying them, can be moved by screwing closer towards or further away from the component to be influenced by the magnetic effect, in order thereby to provide for adjustability of the desired effect.

As an alternative and/or supplemental to the holding magnet or magnets, as indicated above, it is further possible in accordance with the invention to pass around the outside periphery of the movable cable drum a sliding band or belt, in particular a textile band or belt or a felt band or belt or more particularly a belt of plastic material such as PE, POM or PTFE, which when the measuring cable is wound correctly on the cable drum does not involve any contact with the wound turns of the measuring cable or bears against them without applying any force thereto, but which in contrast applies a force to the measuring cable if it climbs up on to a previous turn already formed on the cable drum.

Further objects, features and advantages of the invention will be apparent from the description hereinafter of preferred embodiments of the invention.

BRIEF DESCRIPTION OF THE DRAWINGS

FIGS. 1, 1a, 1b and 1c show views in longitudinal section taken along line 1—1 in FIGS. 2 through embodiments of measuring cable travel sensors according to the invention, FIG. 9 is a view in longitudinal section of another embodiment of a return drive arrangement, FIG. 14 shows a further embodiment of the travel sensor according to the invention with braking magnets arranged on the cable drum, FIG. 18 shows a view in section through a further embodiment of a measuring cable travel sensor according to the invention.

DESCRIPTION OF PREFERRED EMBODIMENTS

Figure 1B:
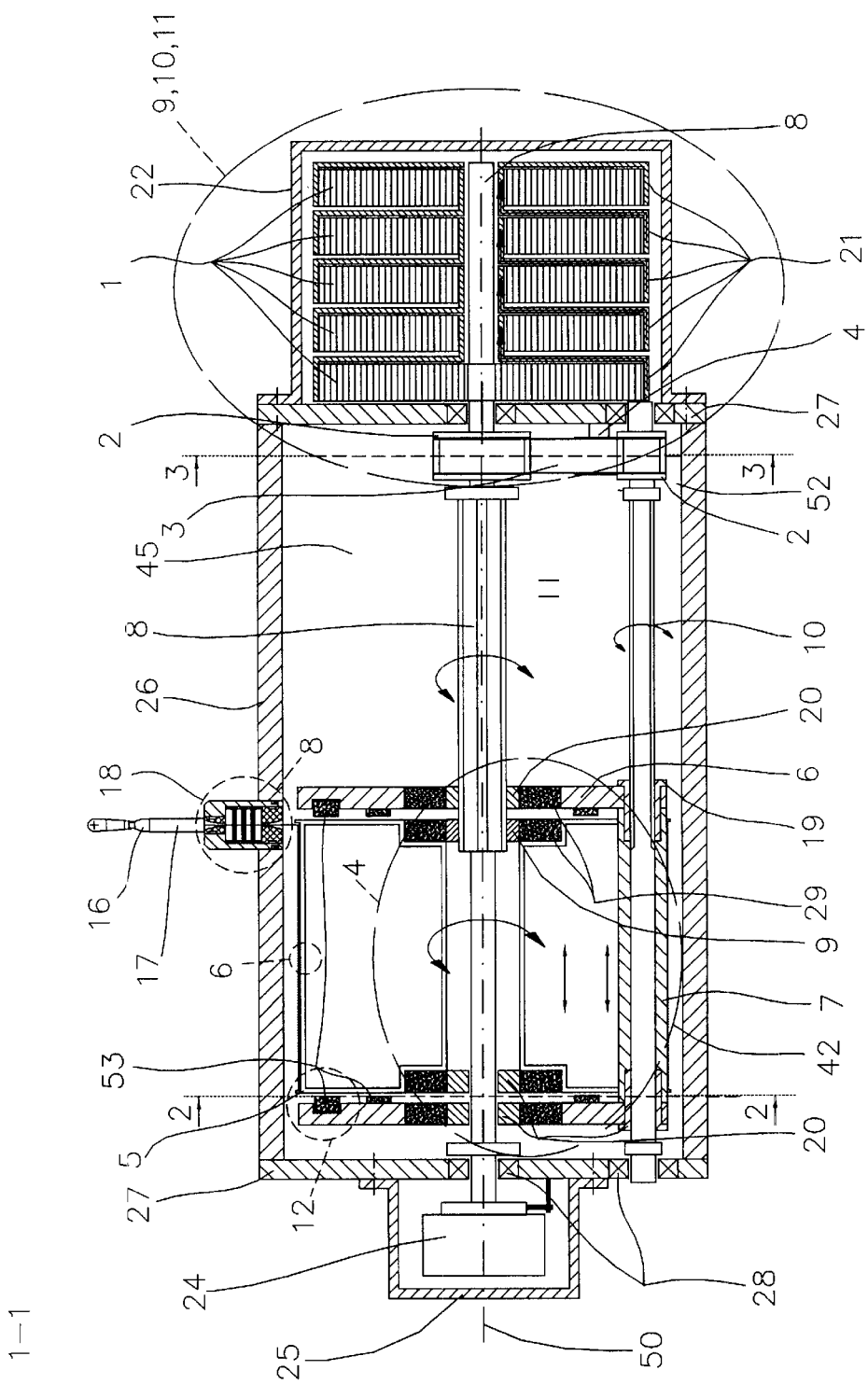
Figure 1C:
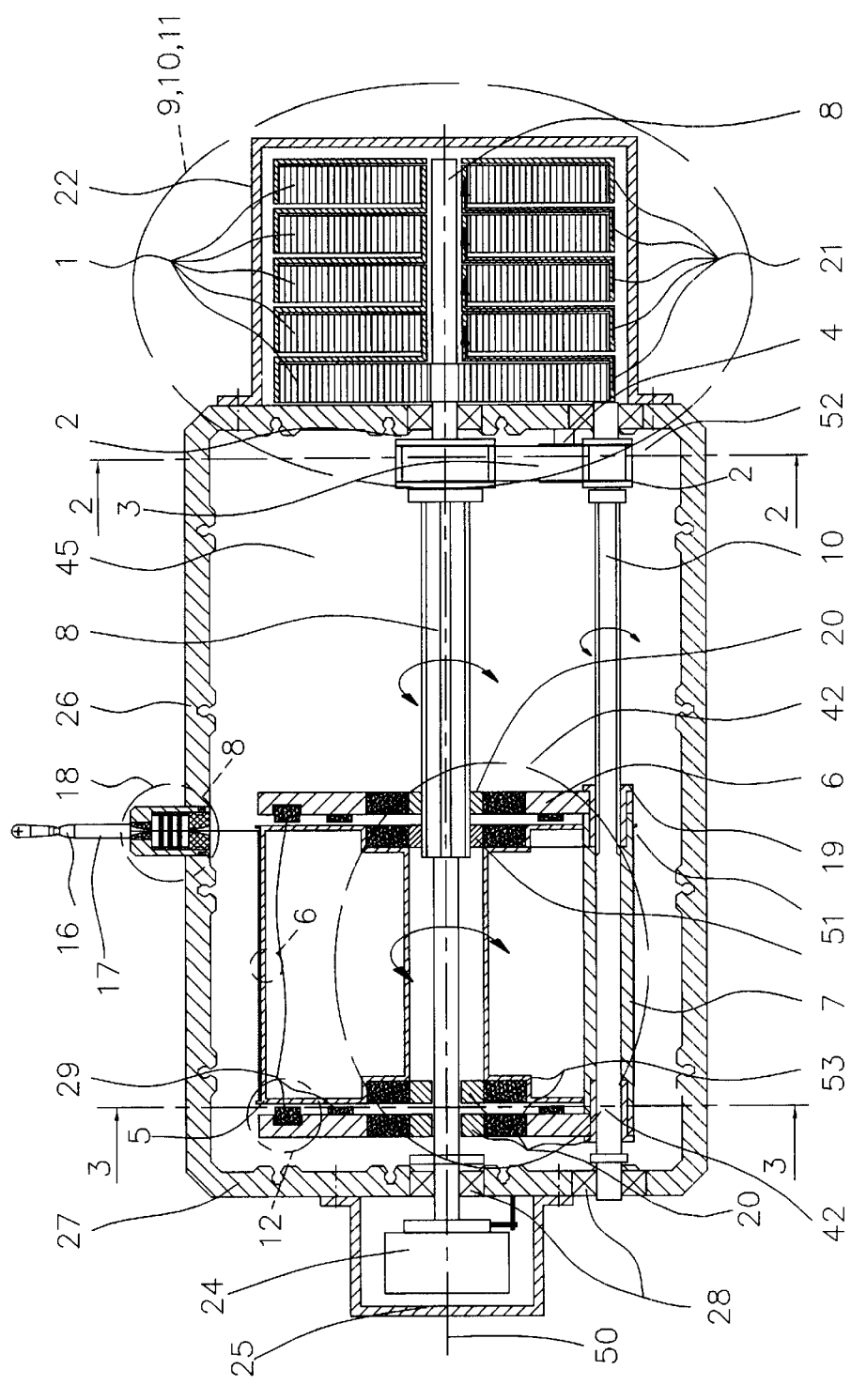

Reference will now be made generally to FIGS. 1 through 1c showing embodiments of a measuring cable travel sensor according to the invention in section taken along a longitudinal direction thereof as indicated at 50, which coincides with the axis of rotation of a central shaft 8 on which a cable drum 5 is longitudinally displaceably but non-rotatably mounted. The shaft 8 passes outwardly through each of respective end plate portions 27 which, together with a closed shaped member 26, form a central housing of the travel sensor. Arranged at one end, being the left-hand end in for example FIG. 1, on the central shaft 8 which is also supported in the end plate portions 27, is a rotary angle sensor 24. The sensor 24 is non-rotatable with respect to the main housing member 26 and is covered by means of a generally cup-shaped sensor housing 25. The sensor housing 25 is fixed by the open edges thereof to the left-hand end plate portion 27 of the main housing member 26, in particular by screw means.

Arranged on the other end of the central shaft 8, that is to say at the right-hand end in for example FIG. 1, is a flat-shape spring cascade or array indicated at 1, comprising a plurality of axially successively arranged spiral springs, to represent the return drive means for the cable drum 5 to bias it in the direction for winding the measuring cable on to the cable drum 5. The individual spiral springs are each disposed in respective individual spring housings as indicated at 21 and overall that return drive means is sealed off relative to the ambient atmosphere by a generally cup-shaped spring motor housing which is fixed with its open side to the outside end face of the right-hand end plate portion 27 of the housing.

Figure 2:
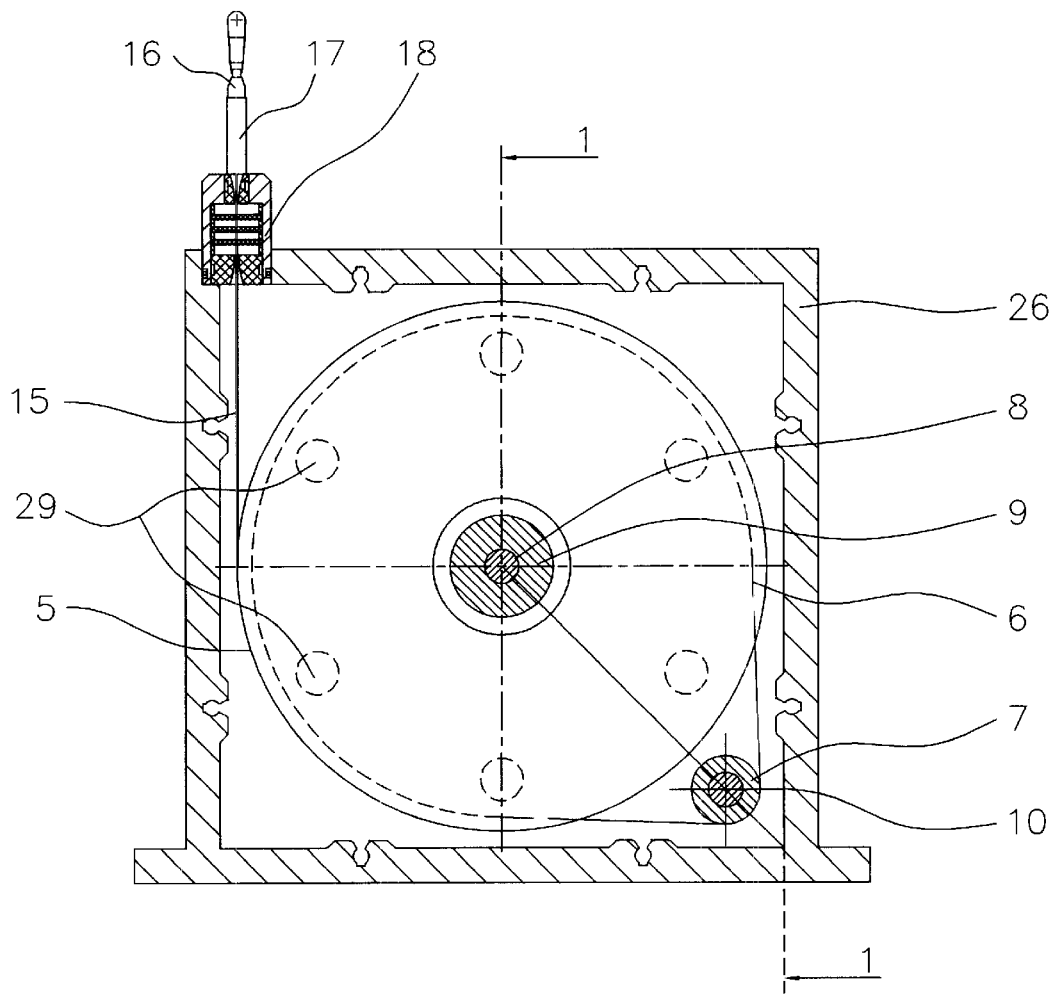
FIG. 2 is a view in section taken along line 2—2 in FIGS. 1 through 1c, FIGS. 3 and 3a are views in cross-section taken along line 3—3 in each of FIGS. 1 through 1c.
Figure 3:
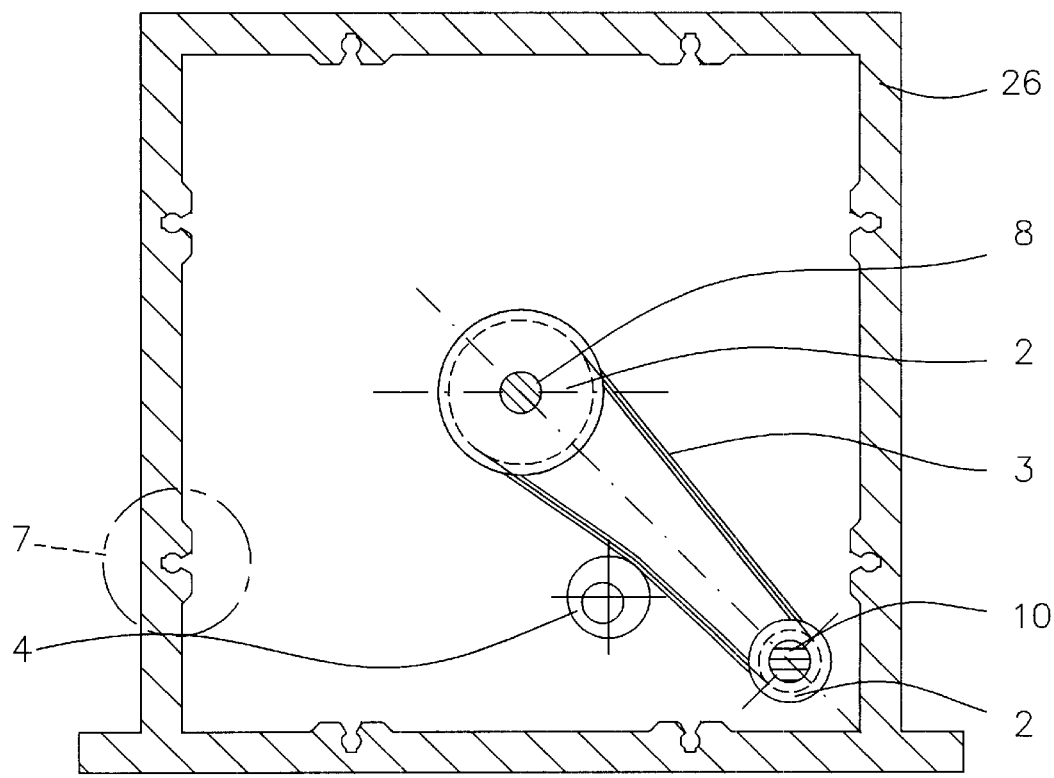
Figure 7:
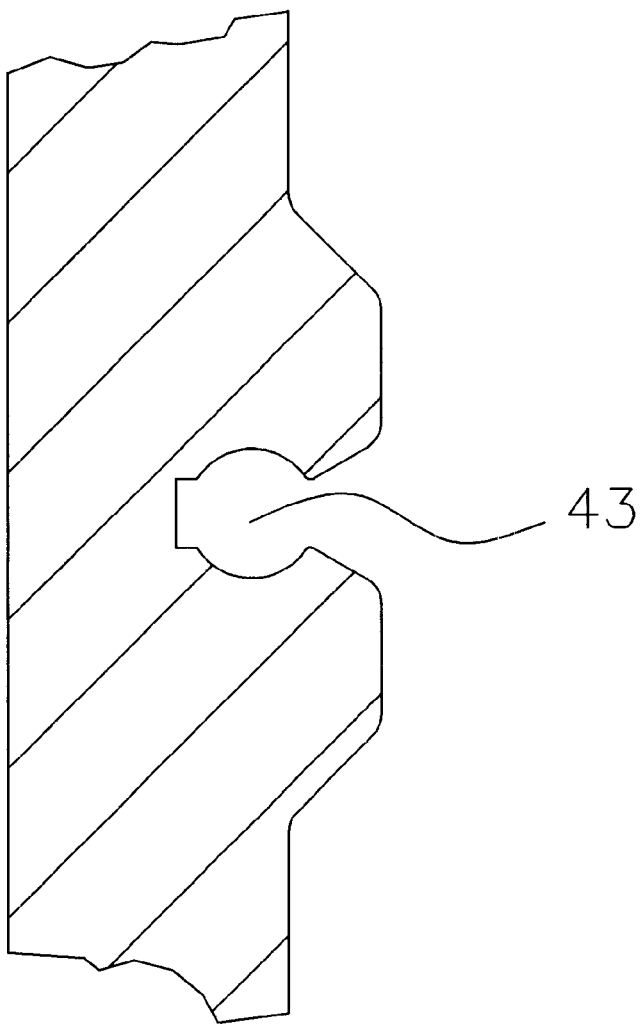
FIG. 7 is a view on an enlarged scale from FIG. 3.

As mentioned above, the central housing of the travel sensor is formed by the closed profile or shaped member 26 which is of a closed configuration and which can be produced for example in the form of an extrusion, as can best be seen from FIGS. 2 and 3 to which reference is therefore directed. The end plate portions 27 are suitably fitted on to the member 26 at the respective ends thereof, for example by screw means. That can be effected by means of self-tapping screws (not shown) which are screwed into screw passages indicated at 43 in for example FIG. 7 which extend in the main body portion of the housing, in the longitudinal direction 50. As can be seen from FIGS. 2 and 3, the screw passages which are shown but not referenced therein are disposed on the inward sides of the member 26. The view on an enlarged scale in FIG. 1 shows that the passages are formed by grooves of an undercut configuration, of an approximately circular cross-section in the undercut region, in which the screwthread of a self-tapping screw can screw with its thread-cutting action.

In comparison with the embodiment shown in FIGS. 1 and 1a, FIGS. 1b and 1c show a modified structure which, while being of the same general configuration, has a central housing portion which admittedly also comprises a closed, generally box-shaped portion 26 with screw passages 43 and end plate portions 27 fitted thereto, but in which the direction in which the box-shaped profile portion 26 extends is in transverse relationship with respect to the longitudinal direction 50 and thus transversely with respect to the direction in which the shaft 8 extends, and accordingly the cover plate portions 27 are parallel to the shaft 8.

The advantage of this structure is that, when the end plate portions 27 are removed, the mountings of the central shaft 8 and the screwthreaded spindle indicated at 10 are not affected as a result.

Reference will now additionally be made to FIG. 2 showing the arrangement of a cable entrance member, viewed in the longitudinal direction of the assembly, in one of the corners of the approximately square shaped member 26, but in the longitudinal direction, as in FIG. 1, in the center of the member 26.

Figure 8:
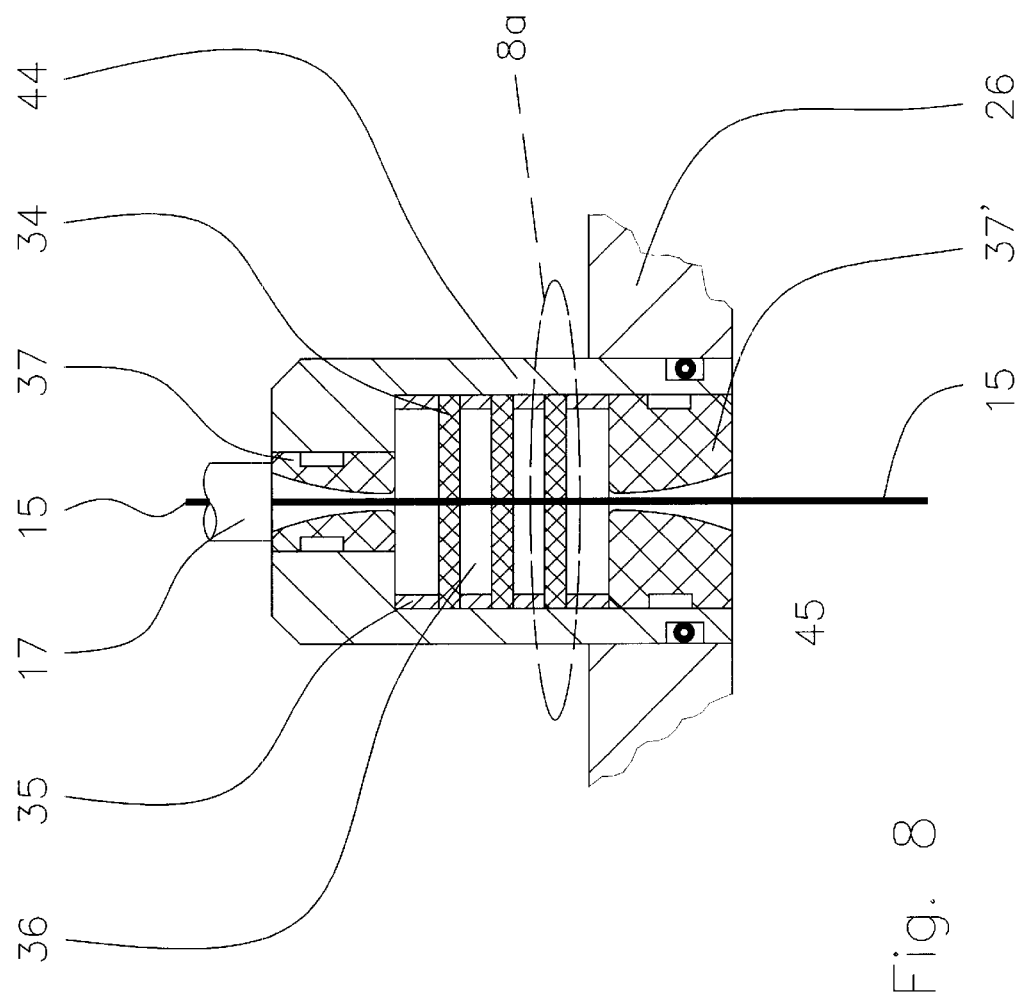
FIG. 8 is a detail view on an enlarged scale of the cable entrance member from the structures shown in FIGS. 1 through 1c.

The cable entry member is shown on an enlarged scale in FIG. 8. It has a generally cup-shaped main body 44 with a through bore extending through the closed bottom of the cup shape. The main body. 44 is fitted in sealed relationship into a suitable opening in the housing member 26. Disposed in the small opening extending through the bottom of the main body 44 is a cable guide means as indicated at 37 comprising a material with a high level of resistance to wear, with an opening which enlarges outwardly in a generally funnel-shaped configuration. At the narrowest location in the opening, the opening in the cable guide means which is indicated at 37 extends to close to the measuring cable 15.

Disposed in the region of the opening through the main body 44 of large cross-section, are cable scraper members 34 which are disposed in a successive array and which are of a generally plate-like configuration extending transversely with respect to the direction in which the measuring cable 15 passes through the cable entry member. The cable scraper members 34 are separated by spacer rings 35. They each have an opening there through, with the internal diameter thereof bearing against the measuring cable 35 in an annular configuration there around. Dirt and the like which is scraped off the measuring cable 15 can be deposited in the hollow spaces or cavities 36 which are formed thereby, between the individual cable scraper members. Those cavities can also be filled with grease or another material or agent for binding the dirt to prevent it from being entrained into the interior of the travel sensor housing. Disposed in the main body 44, towards the interior 45 of the central housing of the travel sensor, is a further cable guide means 37' which has an opening which is also of a generally trumpet-shaped configuration enlarging on this occasion towards the internal space 45 of the central housing.

Figure 8A:
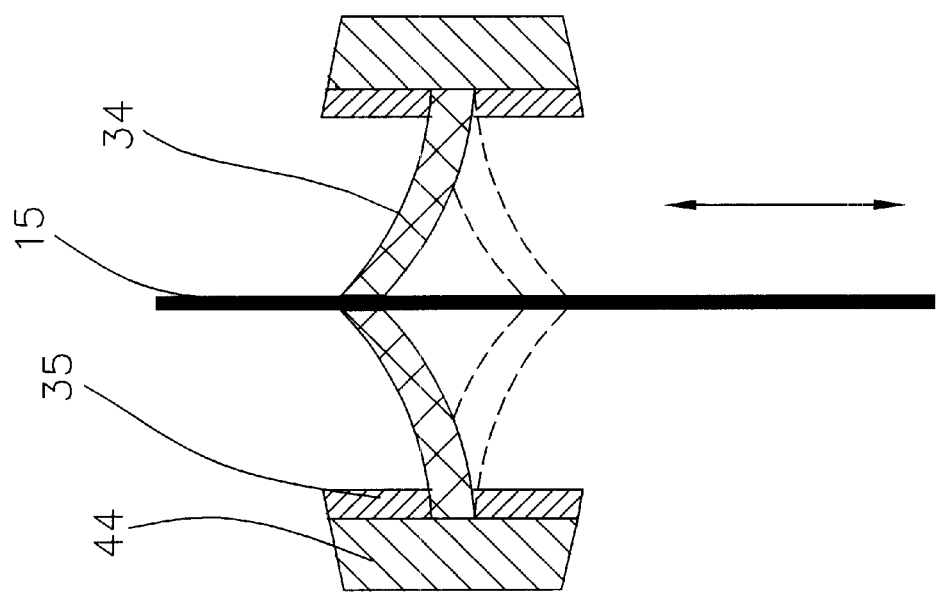
FIG. 8a shows a further detail on a further enlarged scale of the cable entrance member.

FIG. 8a shows the way in which the fact that the cable scraper members 34 bear against the measuring cable 15 causes them to be respectively deformed in accordance with the direction of travel of the measuring cable 15, in the corresponding direction, by virtue of sliding friction against the measuring cable 15.

Reference will again be directed to FIG. 1 which shows the cable drum in the left-hand limit position of its longitudinal travel within the housing member 26 accommodating it. The cable drum 5 is arranged in concentric relationship with respect to the shaft 8 which in the displacement travel region of the cable drum 5 is in the form of a splined shaft, as can best be seen from FIG. 2.

The cable drum 5 has a through opening in which a sleeve-shaped splined nut is non-rotatably connected to the cable drum 5, the internal profile of which is carried longitudinally displaceably but non-rotatably on the external profile of the splined shaft 8. The flat spring array 1 biases the cable drum 5 in the direction of winding the measuring cable 15 on to the cable drum so that, in the limit position shown in FIG. 1 the measuring cable 15 is completely wound on to the cable drum 5 and therefore the cable attachment portion 16 which is there fixed to the free end of the measuring cable bears against a damping element 17 at the cable entry member.

By pulling on the measuring cable 15 to extend it from the travel sensor housing, the measuring cable 15 is unwound from the cable drum 5 and thereby the splined shaft 8 is caused to rotate by virtue of the non-rotatable connection thereof to the nut 9.

A drive member illustrated in the form of a belt pulley such as more particularly a toothed belt pulley and identified by reference numeral 2 in for example FIG. 1, which is disposed at the right-hand end of the shaft 8 and non-rotatable thereon is operatively connected by way of a toothed belt 3 to a further toothed belt pulley 2 which is non-rotatably disposed on a screwthreaded spindle indicated at 10 in for example FIG. 1, in order thereby to rotate the screwthreaded spindle 10. As FIGS. 2 and 3 show, the screwthreaded spindle 10 is disposed in one of the corners of the rectangular interior 45 of the housing member 26 and extends parallel to the central shaft 8 which is arranged approximately in the middle of the cross-section of the interior 45 of the housing member 26.

Figure 4:
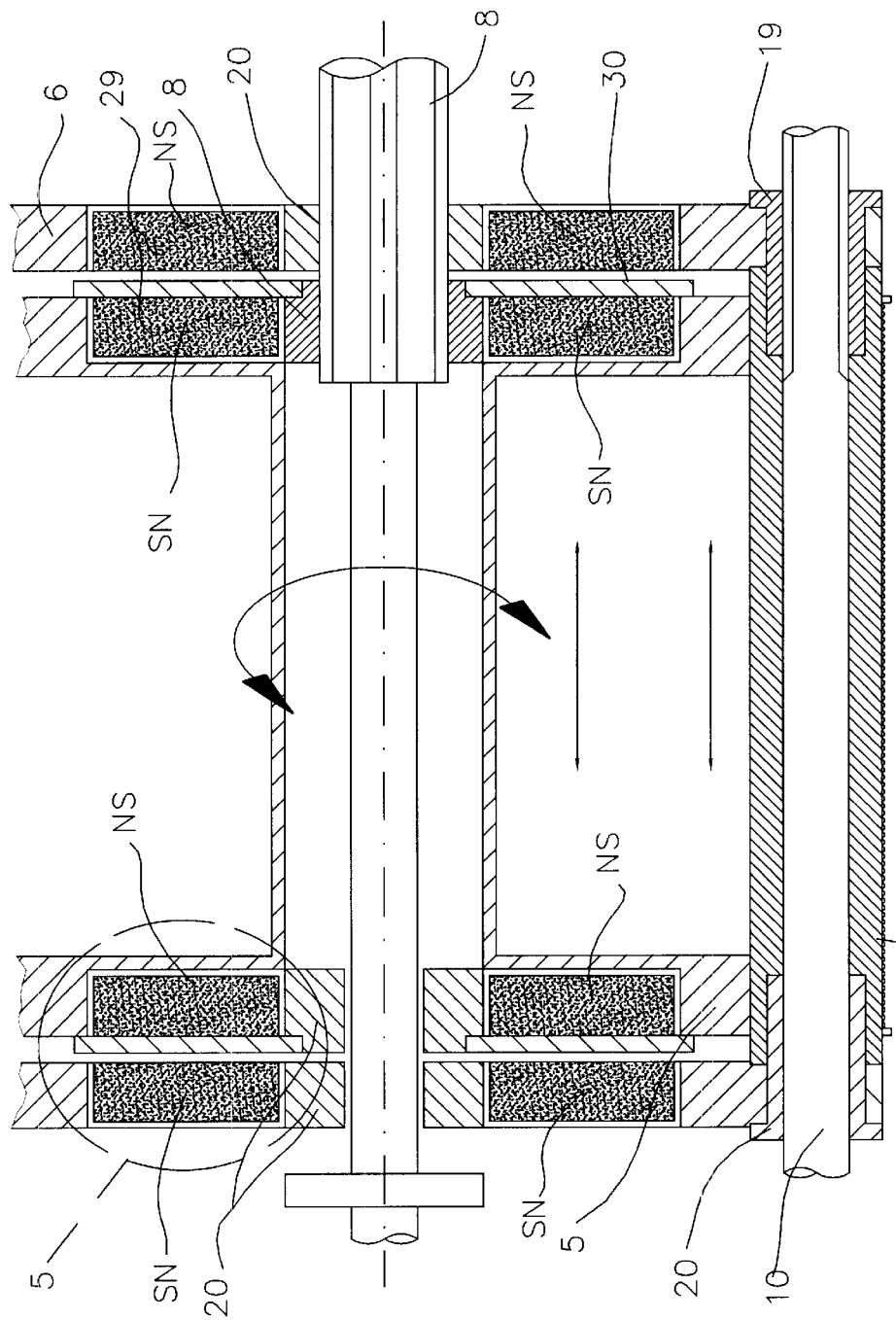
FIG. 4 is a detail view on an enlarged scale of a sliding carriage shown in FIGS. 1 through 1c, FIGS. 5a and 5b show detail views of support magnets in FIG. 4.

As can best be seen from the detail view on an enlarged scale in FIG. 4 from FIG. 1, the cable drum 5 is arranged in the longitudinal direction 50 between two end plates 6 of a carriage or slider 42. The end plates 6 are arranged transversely with respect to the longitudinal direction 50. The carriage 42 has a tubular slide portion 7 which connects the end plates 6 and which is suitably carried on the screwthreaded spindle 10. The tubular slide portion 7 and the end plates 6 are connected together by sleeves or bushes 19, 20 of which the left-hand bush 20 is in the form of a plain bearing bush 20 in relation to the external contour of the screwthreaded spindle 10 which is in that region smooth and without a screwthread. In contrast, the right-hand bush 19 is in the form of a spindle nut which co-operates with the male screwthread on the screwthreaded spindle 10.

Disposed in the end plates 6 in alignment with the central shaft 8 are receiving openings or bores in which the splined nut 9 which can comprise two individual parts which can be inserted from the ends, is supported radially by way of deep-groove ball bearings 28 or plain bearings.

The extent of the longitudinal displacement of the carriage 42 and therewith the cable drum 5 for each revolution of the cable drum 5 is thus determined on the one hand by the pitch of the screwthread on the screwthreaded spindle 10 and the nut 19, but also on the other hand by virtue of the transmission ratio of the additional transmission 52 comprising, as described above, the two toothed belt pulleys 2 and the toothed belt 3 co-operating therewith.

It will be appreciated that the transmission ratio of the transmission 52 can be varied by exchanging one or both of the belt pulleys 2 for other belt pulleys of larger or smaller diameter, in a simple procedure. In order to compensate for the resultingly varying length by which the toothed belt 3 wraps around the respective belt pulleys 2, the arrangement, as can be seen from FIG. 3, may have a tensioning roller 4 which bears against the toothed belt 3 on the outside of one of the runs thereof, with an eccentric external contour, so that by rotating same it is possible to deflect the toothed belt 3 into a position in which it enjoys the appropriate tension.

Figure 3A:
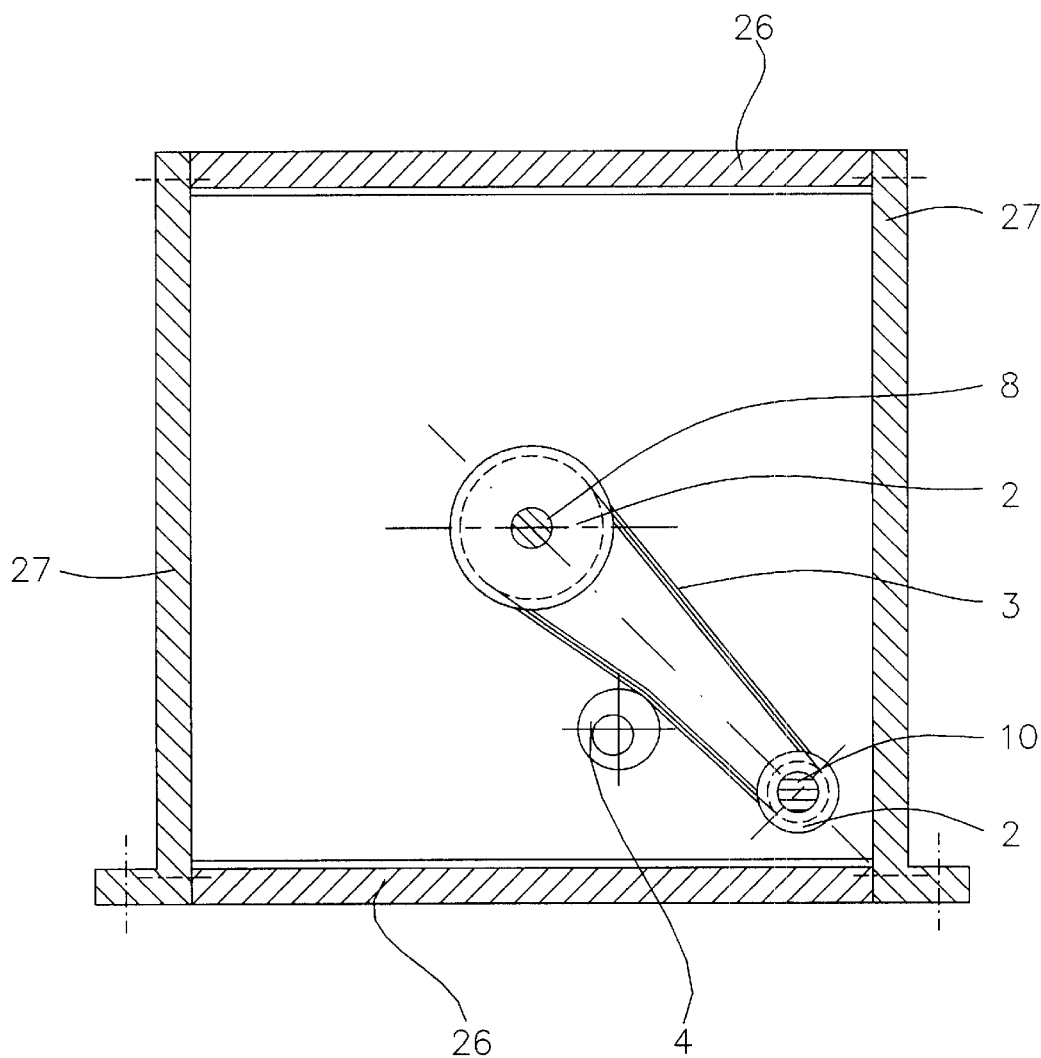

FIG. 3a shows a cross-sectional view similar to FIG. 3 but in section through the structures shown in FIGS. 1b and 1c, that is to say with a configuration of the housing member 26 including its screw passages 43, in transverse relationship with respect to the longitudinal direction of the central shaft 8.

Figure 6:
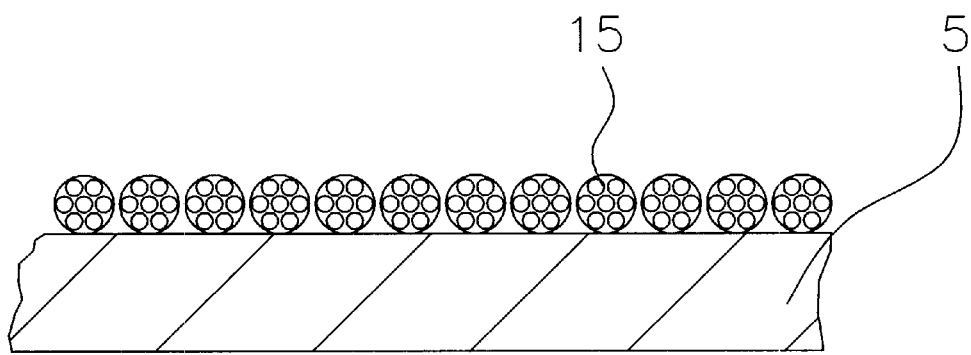
FIG. 6 is a detail view on an enlarged scale of a cable drum with measuring cable wound thereon from the structures shown in FIGS. 1 through 1c.

Depending on the thickness of the respective measuring cable 15 used, it is possible, by suitable selection of the transmission ratio of the additional transmission 52, to so adjust the longitudinal displacement of the cable drum 5 that, as shown in the view on an enlarged scale in FIG. 6, the individual turns or windings of the measuring cable 15 on the measuring cable drum 5 are in snugly juxtaposed relationship without however coming into contact with each other. That reduces the wear on the measuring cable 15.

FIG. 4 further shows that, instead of the axially operative ball bearings 28 in FIG. 1, the cable drum 5 can also be guided relative to the end plates 6 of the carriage 42 in a contact-free mode of operation, as will now be set forth below.

Axial guidance is afforded by virtue of the fact that the nut 9 which is present in FIG. 4 only at the right-hand side thereof and on which the cable drum 5 is non-rotatably fitted is guided on the splined shaft 8 with a precise fit thereon, that is to say radially fixedly and only axially displaceably. In order in that case to ensure that the ends of the nut 9 do not rub against the left-hand or right-hand end plates 6, axial mounting between the two end plates 6 is afforded by permanent magnets diagrammatically indicated at 29 in FIG. 4. With their poles oriented in the longitudinal direction 50, the permanent magnets 29 are arranged on the one hand in the outside end faces of the cable drum 5 on both sides, and on the other hand on the insides of the end plates 6, which face towards the cable drum 5. Preferably the permanent magnets 29 are arranged in an annular arrangement concentrically around the central shaft 8.

As can be clearly seen from FIG. 4 the magnets of the cable drum 5 on the one hand and the respective end plates 6 on the other hand have identical poles facing towards each other so that they mutually repel. As a result the cable drum 5 is automatically positioned in central relationship between the two end plates 6.

As the side view in FIG. 5a and the plan view in FIG. 5b show in detail the magnets 29 can be surrounded by generally cup-shaped pole shoes or pieces 29' which act as flux-guide portions and which comprise for example soft iron. The open side of each pole piece faces towards the respective oppositely disposed magnet.

To cater for the situation of failure or insufficient repulsion force in respect of the permanent magnets 29, contact disks 30 of material with a low coefficient of friction, for example TEFLON or another plastic material, are additionally arranged at the ends on the cable drum 5.

Figure 12A:
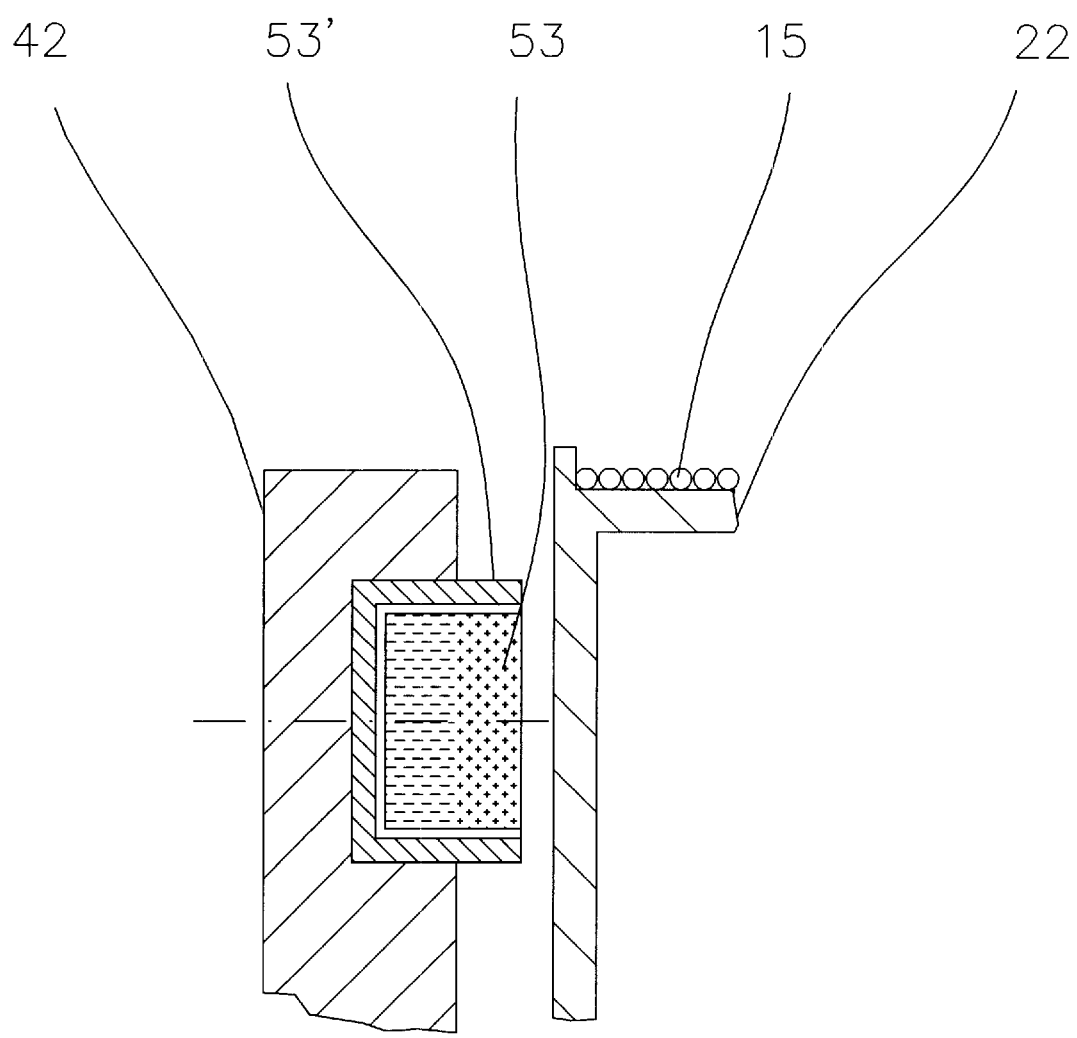
FIGS. 12a and 12b show detail views of arrangements of braking magnets.
Figure 12B:
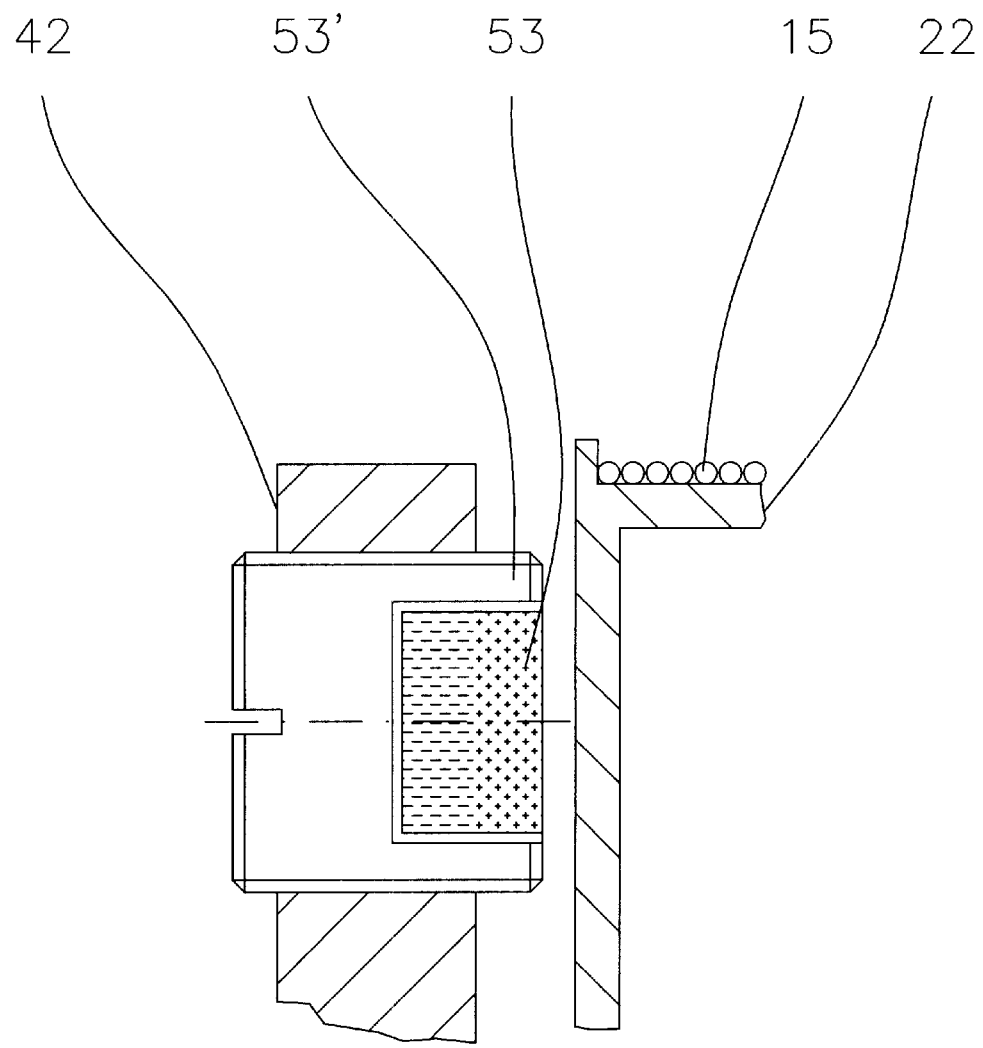

Reverting now to FIGS. 1a and 1c, the structure of FIG. 1a differs from that shown in FIG. 1 and the structure of FIG. 1c differs from that shown in FIG. 1b by virtue of the provision of retardation or braking magnets as indicated at 53, which are operative between the cable drum 5 and the end plates 6 of the carriage 42 and which for that purpose are arranged on the end plates 6 in the proximity of the external periphery of the cable drum 5 and are directed towards the end plates thereof, as can be better seen in detail from FIGS. 12a and 12b. The magnets 53 produce their braking action both when the measuring cable 15 is being pulled off the cable drum 5 and also when it is winding there onto, and thus provide for defined, neat and tidy winding-on and unwinding of the measuring cable 15. As illustrated in FIG. 12a the magnet 53 is surrounded by a generally cup-shaped pole piece 53' and as shown in FIG. 12b the pole piece 53 is formed at the same time as a screwthreaded pin or bolt and can be screwed with its male screwthread in the longitudinal direction into the carriage 42, whereby it is possible to adjust the spacing relative to the cable drum 5 and thus the retardation or braking effect.

Figure 10:
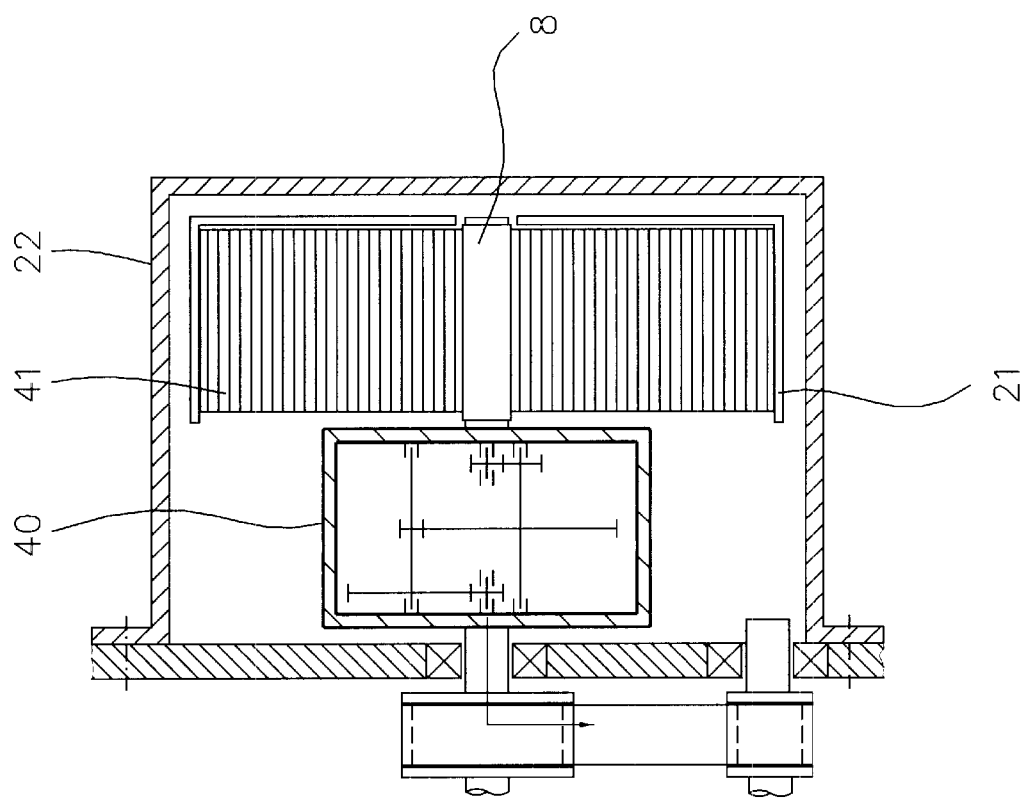
FIG. 10 is a view in longitudinal section of a third alternative embodiment of a return drive arrangement.
Figure 11:
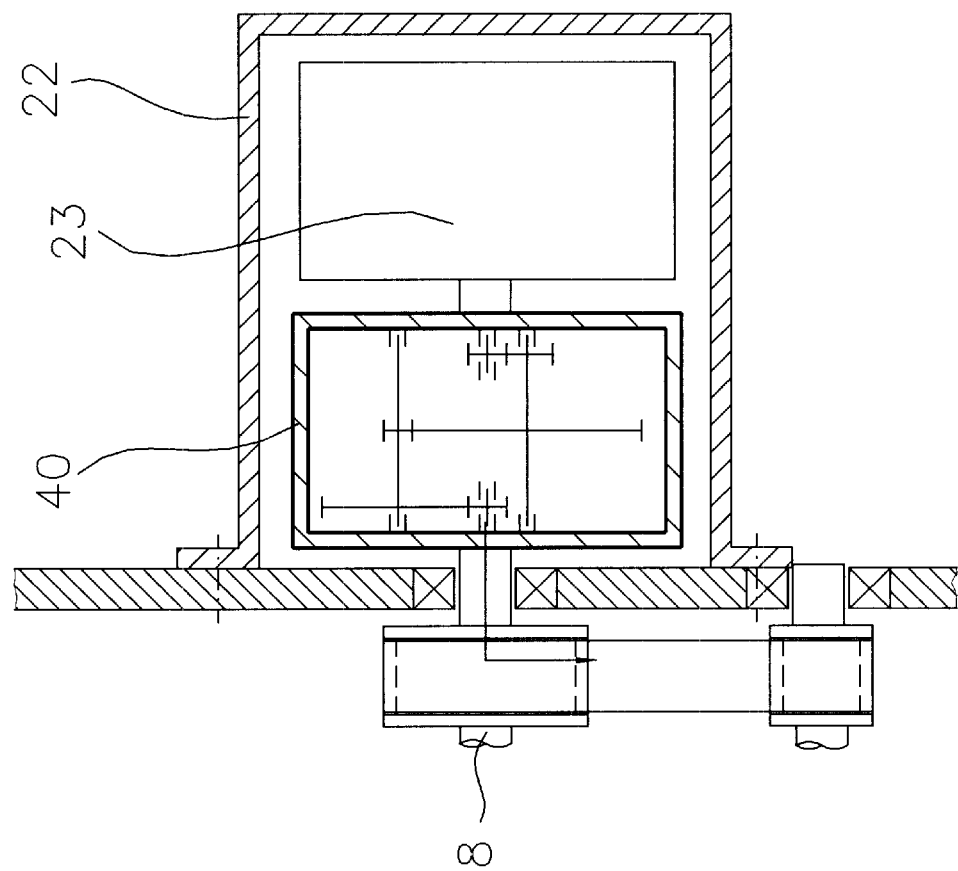
FIG. 11 is a view in longitudinal section of a fourth alternative embodiment of a return drive arrangement.

Reference will now also be made to FIGS. 9 through 11 showing other structures for the return drive, instead of the spring array indicated at 1 in for example FIG. 1. As shown in FIG. 9, instead of the spring array 1, the arrangement uses an electric motor 23 with suitable control system which, similarly to the spring array 1, is carried in coaxial relationship on the right-hand end of the shaft 8 and is covered by a corresponding generally cup-shaped motor housing 22.

In the structure shown in FIG. 10, a transmission 40, in particular a gear transmission, is interposed between a spiral spring 41 or a flat shape spring and the shaft 8, to provide a suitable step-up or step-down transmission ratio.

In the structure shown in FIG. 11, the electric motor 23 is not connected directly to the shaft 8 as in FIG. 9, but is connected thereto by way of a transmission 40 such as a gear transmission for a suitable step-up or step-down transmission ratio.

Figure 13:
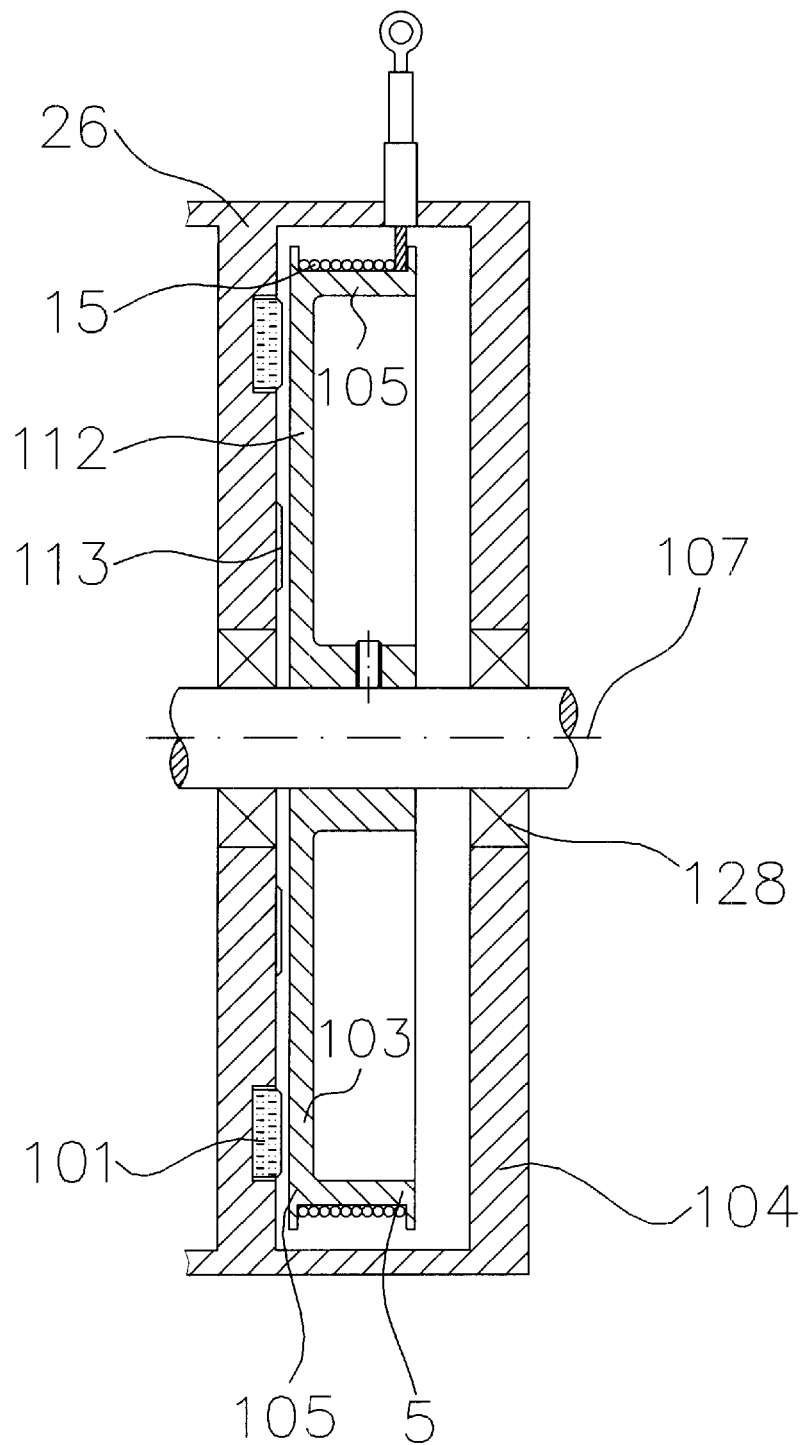
FIGS. 13, 13a and 13b show sectional views through parts of various embodiments of the travel sensor according to the invention, with a housing with braking magnets arranged therein.

Reference will now be made generally to FIGS. 13 and 14 which each show a respective embodiment of a measuring cable travel sensor according to the invention, comprising a rotatable cable drum 5 which is suitably fixed on a rotatable shaft and which can thus rotate about an axis of rotation as indicated at 107 in FIGS. 13 and 14. For that purpose the rotatable shaft is supported by means of bearings 128 in a housing which in the illustrated structure comprises a generally box-shaped, preferably closed profile member 26.

The cable drum 5 comprises a winding cylinder 105 with an external peripheral winding surface 106 which thus forms the external periphery of the winding cylinder 105. The winding cylinder 105 has radially outwardly,facing abutments at each of the two ends thereof for limiting the arrangement of a measuring cable 15 which is to be wound on the winding surface 106. The winding cylinder 105 joins to the hub region of the winding drum 5 in a single step by way of individual spokes or a spoke disk as indicated at 112 for example in FIG. 1.

While in FIG. 13 the spokes or the disk 112 coincide with and are in alignment with the one axial end of the winding cylinder 105 and thus the cable drum 5 and are thus disposed closely adjacent to the wall of the housing member 26 which is at the left in FIG. 13, in the structure shown in FIG. 14 the spoke disk 112 is set back somewhat from the outer axial edge of the winding surface 106 of the winding cylinder 105.

In a corresponding manner, in FIG. 13 the at least one retardation or braking magnet which is indicated at 101 is arranged in that wall of the housing member 26, which is disposed at a small axial spacing in opposite relationship to the drum spoke disk 112, so that there is only a small air gap between the braking magnet or magnets 101 and the disk 112.

Figure 15:
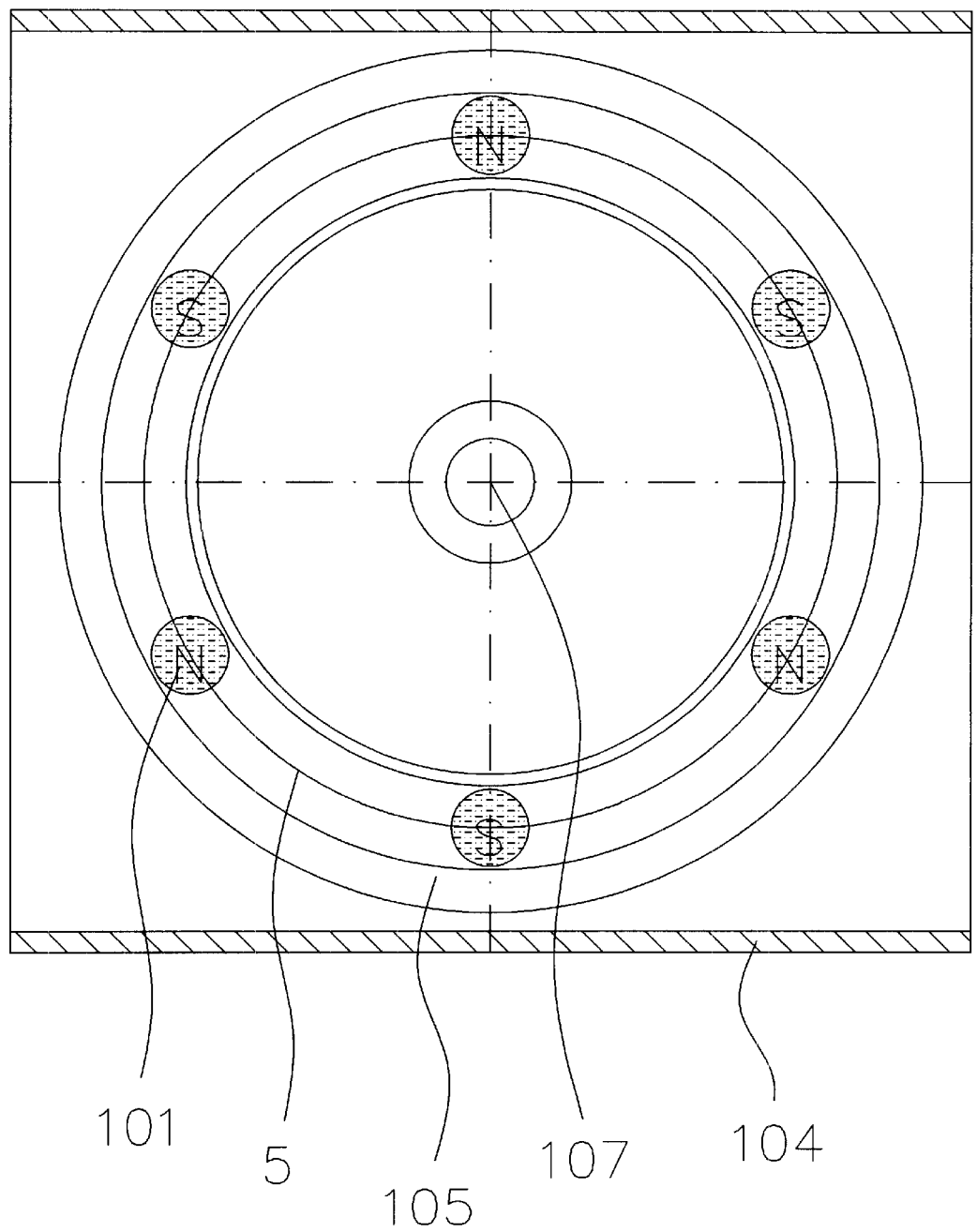
FIG. 15 shows a front view of the cable drum of FIG. 14, FIGS. 16a–16d show detail views of the braking magnets.

The braking magnet or magnets 101 are arranged in the radially outward region of the cable drum 5, adjacent to or in the region of the winding cylinder 105 thereof, being more specifically distributed over the periphery thereof, as can be seen from FIG. 15.

A raised portion on that wall of the housing member 104, indicated at 113, serves as a contact-preventing means, that is to say to prevent the cable drum 5 from adhering to the braking magnet or magnets 101 in the axial direction of the cable drum.

Figure 13A:
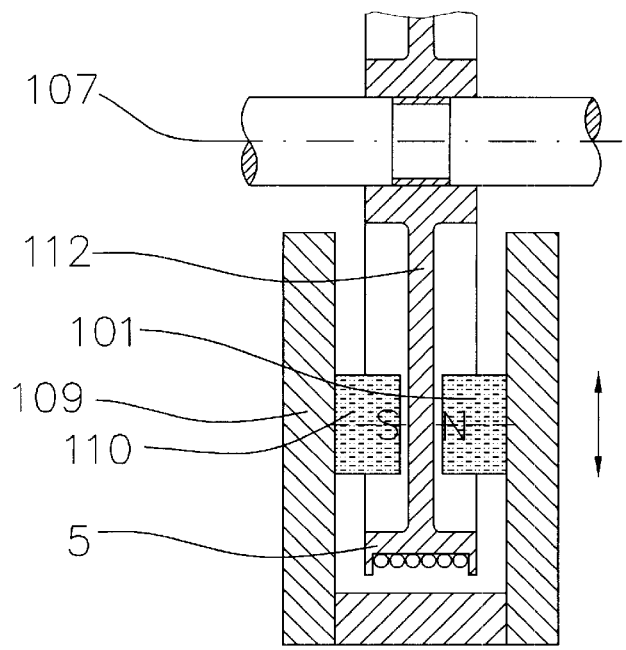

Referring now to the detail view in FIG. 13a, particularly when the cable drum has a drum disk 112 which is disposed at a central location in the axial direction of the cable drum, the braking magnet or magnets 101 can be directed from both sides in alignment in the axial direction towards the disk 112. The first and second magnets 101 which are directed with different poles towards the disk 112 can be fixed on the insides of a generally U-shaped magnet holder indicated at 109 which embraces the radially outer end of the cable drum 5 and which in such an arrangement is displaceable in particular also in a radial direction, for varying the braking force applied to the cable drum.

Figure 13B:
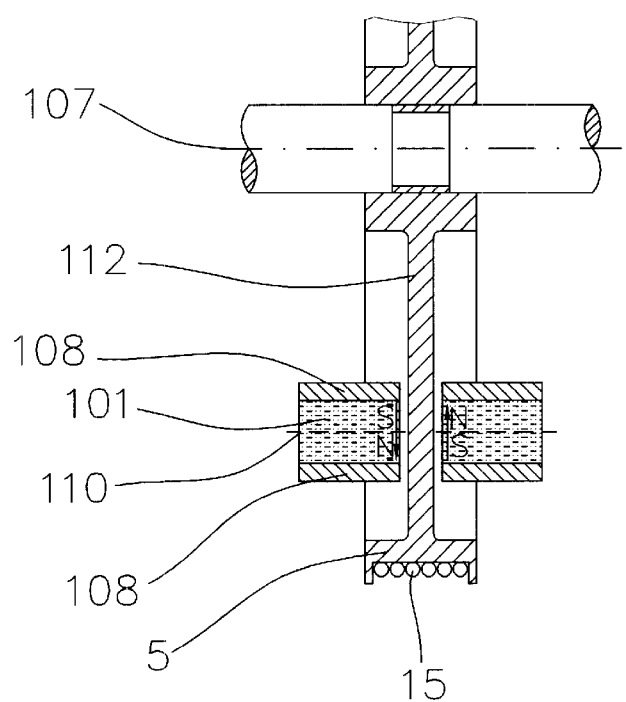

The detail view in FIG. 13b also shows retardation or braking magnets 101 which are directed from both axial directions towards the disk 112 but which, in contrast to the magnets 101 in FIG. 13a, have a magnetisation axis as indicated at 110 which is parallel to the drum disk 112, more specifically in the radial direction thereof, and which are each surrounded on the outside by pole pieces 108 of a generally plate-like configuration.

In contrast to the above-described embodiment shown in FIG. 13 in the structure shown in FIG. 14 the one or more retardation or braking magnets 101 are arranged in the drum disk 112 directly radially within the winding cylinder 105 of the cable drum 5, and face outwardly towards a wall of the housing member 26, which is at a small spacing in opposite relationship to the magnets 101. In this case also, a raised portion corresponding to the raised portion 113 in FIG. 15 forms a contact-preventing means, but in this case the raised portion is provided on the cable drum 5.

Figures 16A, 16B:
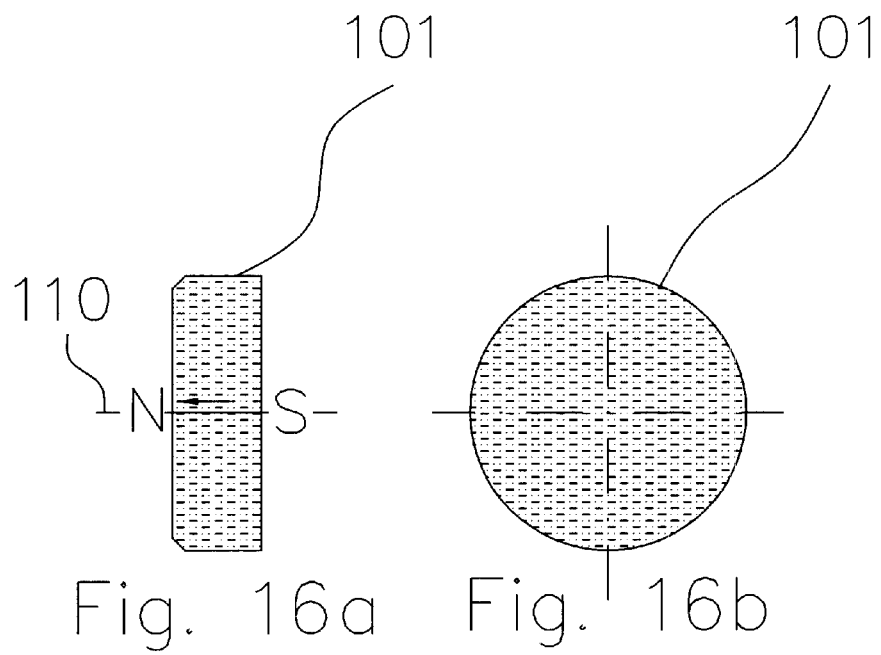
Figures 16C, 16D:
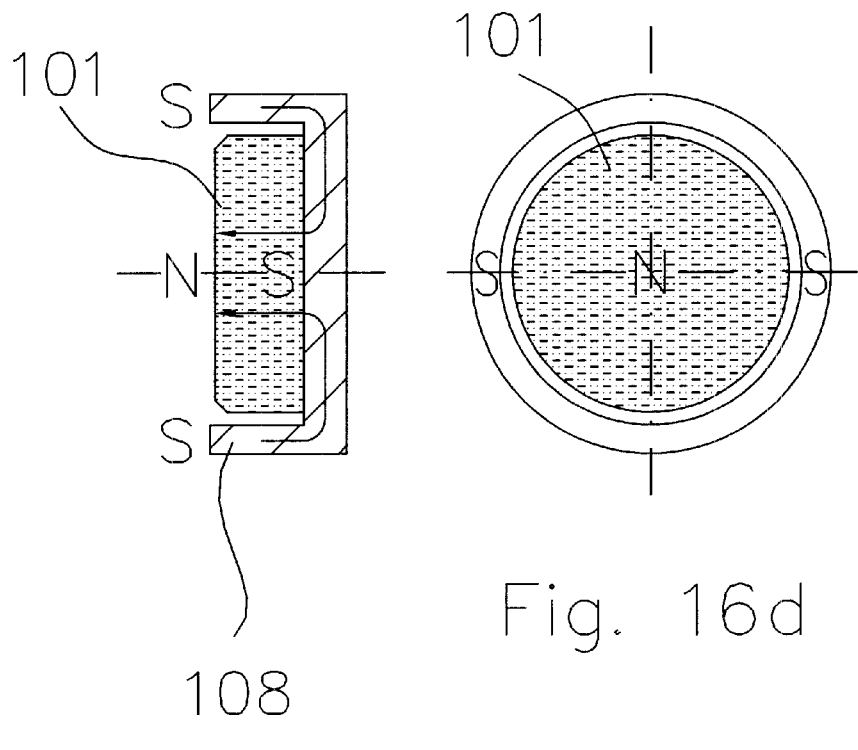

Both cases involve using magnets in the form of retardation or braking magnets 101 which are shown as a front view and a side view in FIG. 16 in two different versions. It will be apparent in this respect that in both cases the actual braking magnet 101 is magnetised in the through direction, through the thickness of the disk, so that the one face represents the North pole and the other represents the South pole. In the embodiment shown in the lower part of FIG. 16, the South pole and the periphery of the disk-shaped magnet are covered by a cup-shaped, one-piece pole shoe or pole piece 108 of soft iron, whereby in functional terms the South pole of that magnet is displaced insofar as the field lines are guided outside the South pole through the pole piece 108 to the open front side of the cup-shaped pole piece 108.

Figure 17A:
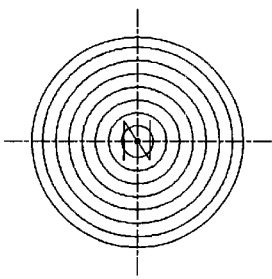
FIGS. 17a through 17r show magnets magnetised in different ways.
Figure 17B:
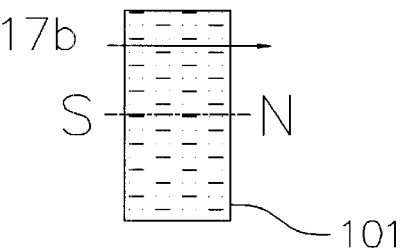
Figure 17C:
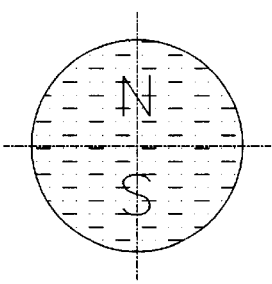
Figure 17D:
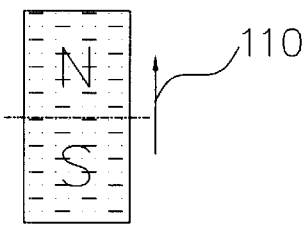
Figure 17E:
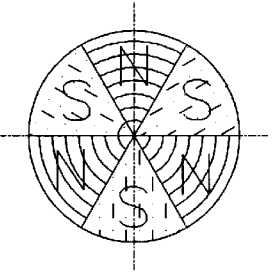
Figure 17F:
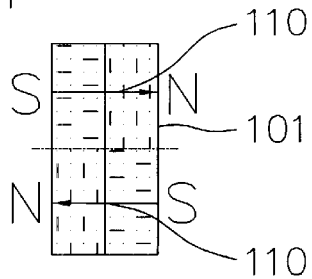
Figure 17G:
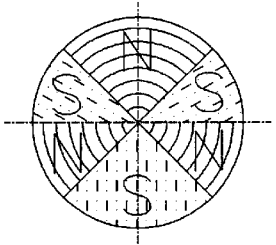
Figure 17H:
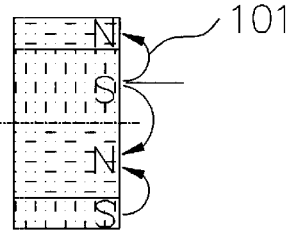
Figure 17I:
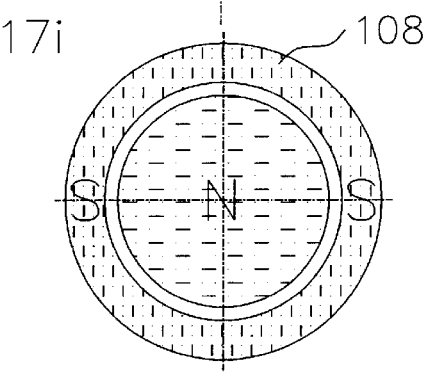
Figure 17J:
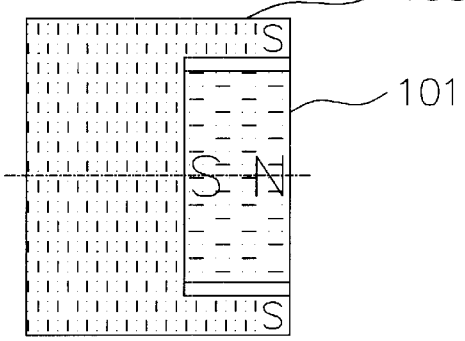
Figure 17K:
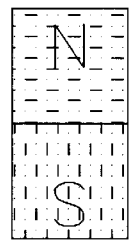
Figure 17L:
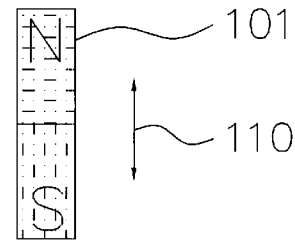
Figure 17M:
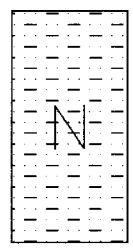
Figure 17N:
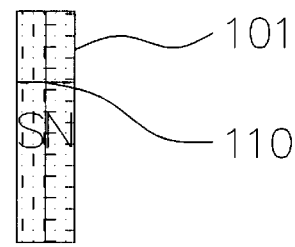
Figure 17O:
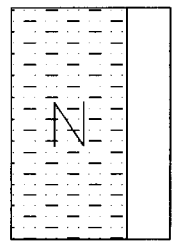
Figure 17P:
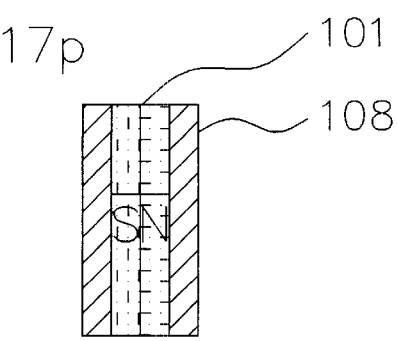
Figure 17Q:
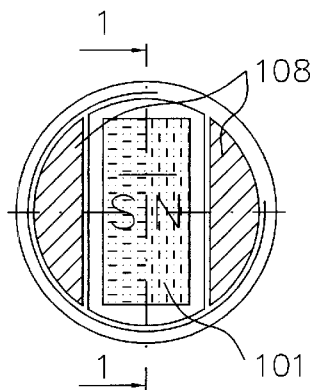
Figure 17R:
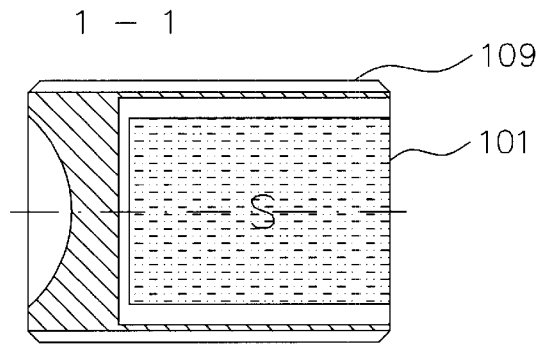

Reference will now be made to FIGS. 17a through 17r showing different forms of magnetisation of magnets of a disk shape. In this respect, FIG. 17a corresponds to the structure shown in FIGS. 16 a–d, wherein the entire face of the disk corresponds to a pole, that is to say a North pole or a South pole. The axial direction of the disk is thus the magnetisation axis. In contrast thereto in FIG. 17c' the magnetisation axis is parallel to the plane of the disk.

In a structure as shown in FIG. 17e, the magnetisation axis 110 is admittedly also parallel to the thickness dimension of the disk, but the disk periphery is subdivided into a plurality of sectors, in this case six, and each sector is magnetised separately in a direction through the disk, but with a polarity which alternates in the peripheral direction, so that on one face there are six different, mutually alternate poles, distributed over the periphery of the disk, and the same configuration on the opposite face, being magnetised axially through the disk in a sector configuration.

Looking at FIG. 17g, shown therein is a similar mode of magnetisation, which differs in a sector configuration, in the peripheral direction, but in this case the disk of the magnet is not magnetised there through in the axial direction thereof, but only one of the faces is overall magnetised so that this magnetised face can be considered as a succession, viewed in the peripheral direction, of bar magnets of different shapes, this therefore entailing lateral magnetisation, in a sector configuration, on one surface of the disk.

FIG. 17i shows the magnet of FIG. 17a but surrounded by a generally cup-shaped pole piece as is already shown in the lower part of FIG. 16 and as has been described hereinbefore.

FIGS. 17k through 17r in contrast show magnets in the form of bar magnets. In the structure shown in FIG. 17k, the longitudinal direction of the bar is the magnetisation direction, that is to say, with the North pole at a narrow end of the bar and the South pole at the opposite narrow end.

In FIG. 17m in contrast the magnetisation direction as indicated at 110 extends transversely with respect to the longitudinal extent of the bar magnet, in other words, with the North pole on the one wide side of the bar magnet and with the South pole on the other wide side.

A similar consideration also applies to the magnet shown in FIG. 17o, which is additionally surrounded by a generally U-shaped pole piece 108, preferably of soft iron, whose limbs which terminate freely are disposed parallel to the South pole and North pole faces.

Such a structure is also shown in principle in FIG. 17q in which however, as viewed in plan view, the outside contours of the pole piece 108 are convexly curved so that the resulting configuration is a generally somewhat round external periphery.

In that way, the magnet 101 and the two pole pieces 108 can be jointly fitted into a cylindrical bore in the end of a magnet holder as indicated at 109 in the right-hand part of FIG. 17q, the holder 109 at its outer periphery which is also cylindrical having a male screwthread (shown but not referenced) for screwing into a fixing opening.

FIG. 18 again shows a sectional view of an embodiment of a measuring cable travel sensor according to the invention, along the axis of rotation as indicated at 107.

In this embodiment also, the cable drum indicated at 5 is rotatably supported by means of its shaft and bearings 128 in side walls of a profile member 26 which serves as a housing.

In contrast to the structures shown in FIG. 13 or FIG. 14, the spoke disk 112 of the cable drum is arranged centrally in the axial direction relative to the winding cylinder 105 whose outside surface which constitutes the winding surface 106 on to and from which a measuring cable as indicated at 15 is suitably wound. In the lower half of FIG. 18, arranged at the inside surface of the winding cylinder 105 in opposite relationship with respect to the spoke disk 112 are first and second holding magnets 102 in the form of bar magnets, which face with opposite poles towards each other, that is to say towards the drum disk 112. In this arrangement the holding magnets 102 preferably project somewhat in the longitudinal direction beyond the outside surfaces of the cable drum 5.

In order not to cause the cable drum 5 to suffer from an unbalance due to the presence of the holding magnets thereon, an identical pair of holding magnets 102 is also arranged on the radially inwardly disposed surface of the winding cylinder 105 on the side in opposite relationship with respect to the axis of rotation 107 of the cable drum 5. Fixing of the magnets is preferably effected by adhesive means.

It is also possible to envisage making an opening through the drum disk 112 in the longitudinal direction, for example by boring or drilling, and inserting there through a single bar magnet to act as a holding magnet 102, instead of the two mutually aligned bar magnets illustrated.

It will be appreciated however that in addition the lower half of FIG. 18 also shows a pair of retardation or braking magnets indicated diagrammatically at 101. They are arranged however at the side walls of the housing member 26 and extend, radially within the winding cylinder 105, to a position in close proximity to the disk 112 of the cable drum 5. For the purposes of adjustability of the air gap there between, the two magnets 101 which once again are arranged with their magnetisation direction parallel to the axis of rotation 107 and which are directed towards each other with opposite poles, are each arranged in respective recesses or depressions in the mutually facing ends of magnet holders 109 having a male screwthread, by means of which they can be screwed into a suitable, axially extending screwthreaded bore through the wall of the housing member 26, so that they are adjustable in regard to the magnitude of the air gap.

In this case, to increase the magnet force, the two magnets 101 are each disposed in a generally cup-shaped pole piece 108 whose open side is in this case also directed towards the drum disk 112 and thus towards the respective mutually oppositely directed magnet 101.

Figure 18A:
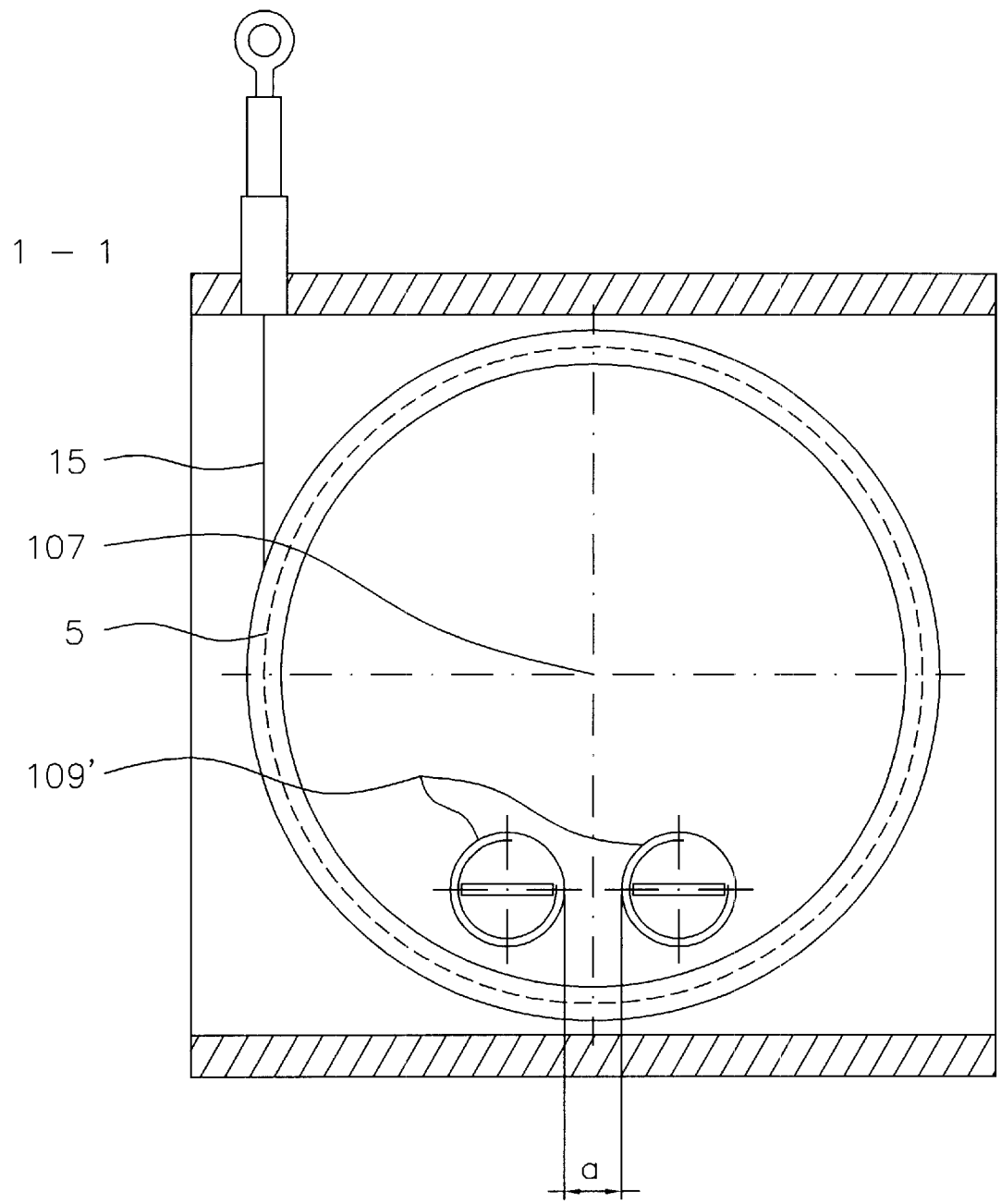
FIG. 18a is a front view of the FIG. 18 structure.

Reference will now be made to FIG. 18a illustrating a side view of the FIG. 18 structure and showing the possibility of arranging not just one but a plurality of such magnets 101, in a peripherally distributed array, in magnet holders 109 in the walls of the housing member 26. A minimum spacing indicated at a in FIG. 18a must be observed there between in order to prevent adverse mutual influencing of the magnets 110.

FIG. 18a further shows that it is not absolutely necessary to provide for uniform peripheral distribution of the magnets 101 or magnet holders 109.

It will be noted in this respect that for reasons of enhanced clarity of the drawing the holding magnets 102 are not illustrated here.

Figure 19:
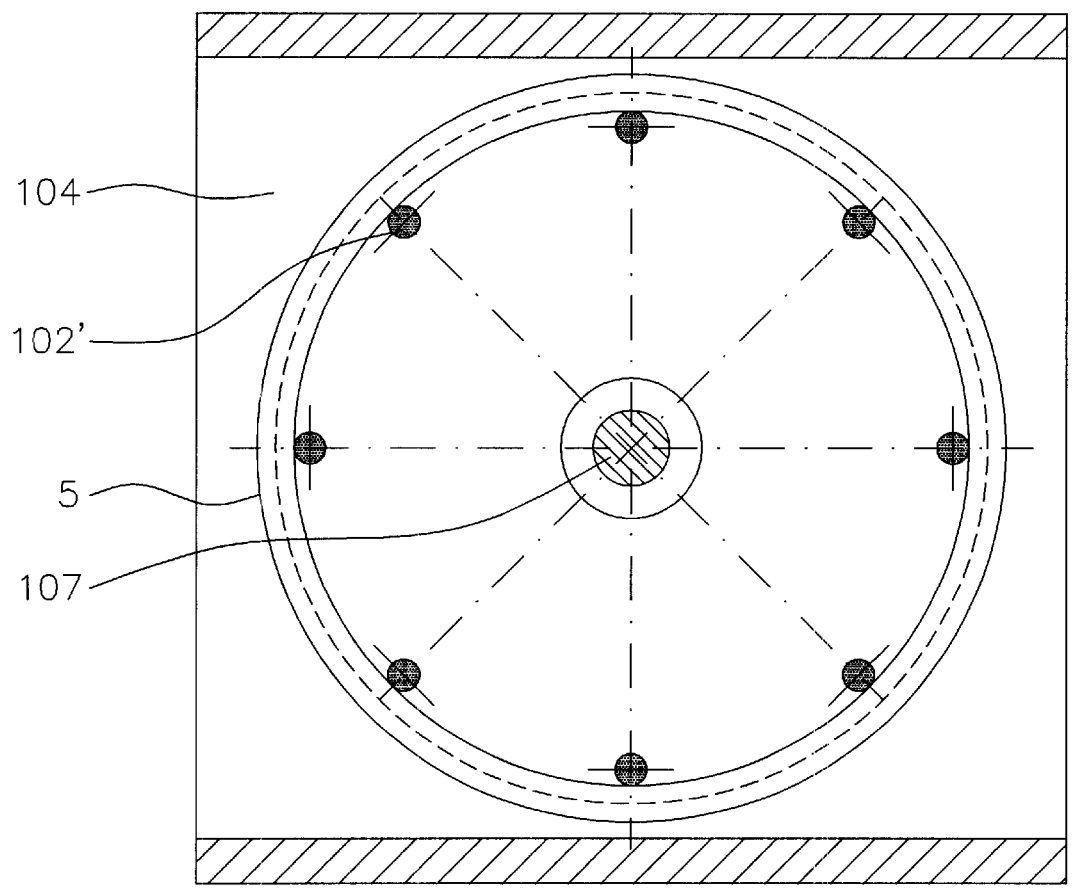
FIG. 19 is a view of the cable drum from FIG. 18, and FIGS. 20a and 20b show further configurations of the measuring cable travel sensor according to the invention.

Attention is now directed to FIG. 19 showing another front view of the cable drum 5 along line 1—1 in FIG. 18.

By virtue of suitable positioning of the section, FIG. 19 shows exclusively the holding magnets 102' on the cable drum 5, there being eight thereof arranged at respective spacings of 45°. This view is intended to make it clear that, in the event of selecting sufficiently strong holding magnets 102', those magnets can serve as combination magnets if the air gap thereof relative to the adjacent housing and in particular relative to the side wall of the housing member 26 is of the correct size. In that case, it is possible entirely to omit additional separate braking or retardation magnets as the holding magnets perform both a holding and a braking function.

Irrespective thereof all the illustrated structures only ever function properly on the basic assumption that in the case of the holding magnets the measuring cable 15 which is subjected to the action of the magnets must comprise a magnetisable material or, in the case of the braking or retardation magnets, the influenced component, that is to say when the braking magnets are arranged on the cable drum this being the housing or when the braking magnets are arranged on the housing this being the cable drum, at least in the influenced region thereof, must comprise electrically conductive material or must be electrically conductively coated.

When using combination magnets as indicated above, those conditions apply cumulatively.

Figure 20:
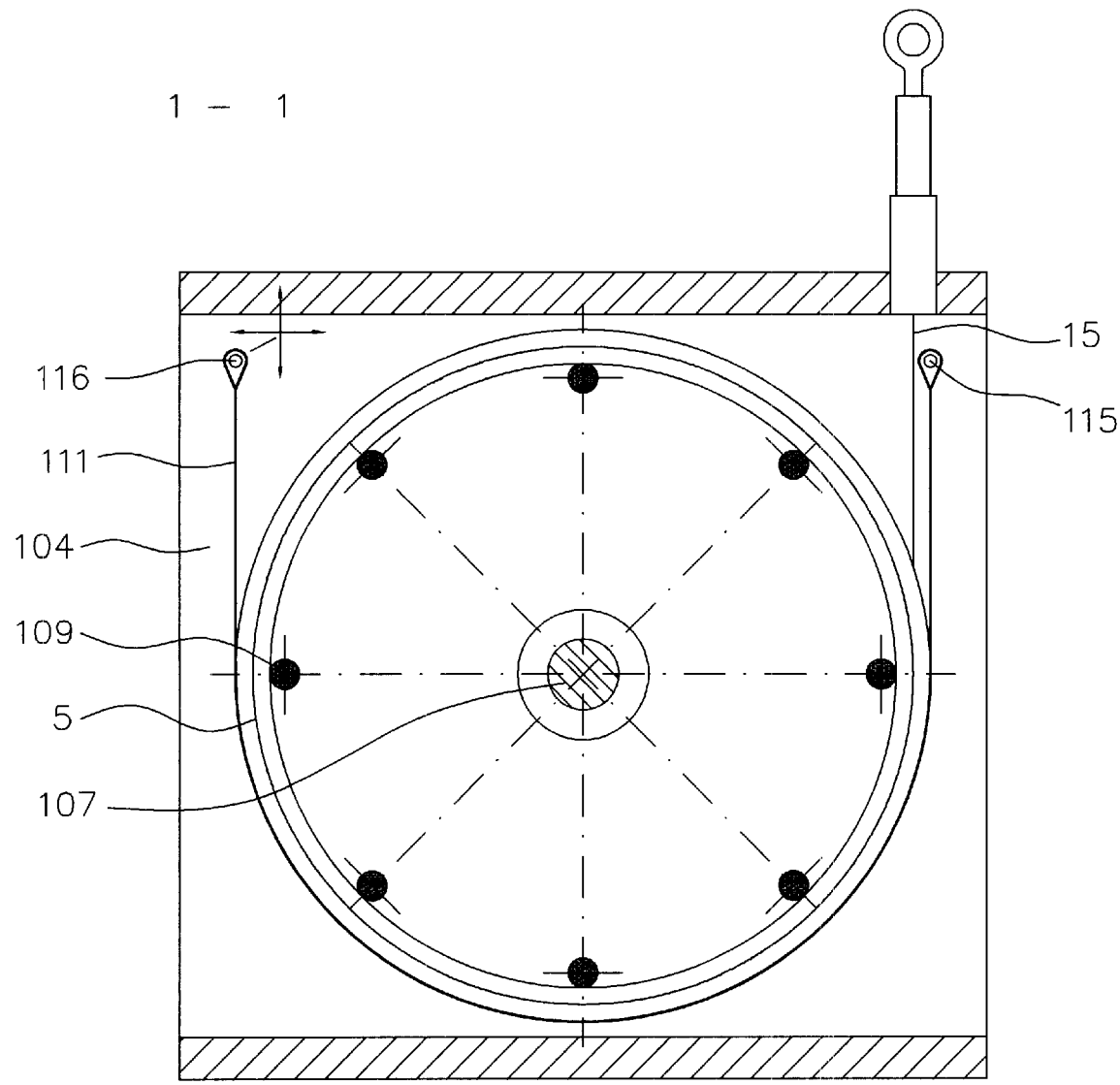

Reference is now directed to FIG. 20 showing a structure which differs from FIG. 19 by virtue of the inclusion of a sliding or friction band or belt indicated diagrammatically at 111. This sliding belt of finite length generally comprises any suitable material such as a textile material or other slidable, non-abrasive material, for example felt or other material which has good oscillation-damping properties. The band or belt 111 is laid around a part of the cable drum 5, that is remote from the cable entrance, more particularly as illustrated extending over a region of about 180°. For that purpose, one end of the sliding belt or band 111 is secured to a fixed point indicated at 115 near to the cable entrance on the housing while the other end is fixed to the housing about an adjustment point 116 on the opposite side of the axis of rotation 107 of the cable drum 5. In that case, the displacement point 116 can be displaceable both tangentially and also radially with respect to the axis 107 of the cable drum 5, more particularly in first and second mutually perpendicular directions, in each case in transverse relationship with the axis of rotation 107.

In that case, the contact between the sliding belt 111 and the outwardly facing surface of the winding of measuring cable on the cable drum 5, such contact being loose or totally absent in the initial condition of the arrangement, can be adjusted in order to intensify or slacken such contact, for the purpose of preventing the measuring cable from rising up or climbing up, that is to say lifting radially outwardly away from the peripheral or winding surface of the cable drum 5, in case the holding magnets 102 or the combination magnets 102' should not be sufficient to achieve that aim. That radial outward movement of the measuring cable can already be impeded by virtue of the fact that there is essentially no contact between the sliding belt 111 and the outwardly facing surface of the winding or measuring cable on the cable drum, as such contact comes into existence only when the measuring cable moves radially outwardly in the above-mentioned, undesired fashion. Consequently the spacing which is possibly present between the outside surface of the turns of measuring cable on the cable drum and the inside surface of the band 111 is to be as small as possible, in an ideal case approximating to zero.

FIG. 20*a* in turn shows a structure in which the sliding band 111 is not laid loosely in the form of a belt around the cable drum with the measuring cable wound thereon, but is in the form of a lining carried on a slide or friction shoe 114. The contour configuration thereof, that is towards the cable drum 5, corresponds to the external contour of the cable-carrying drum 5. The shoe 114 extends through about 90° around the external peripheral surface of the cable drum 5, more specifically, in the winding-on direction, in the segment adjoining the point at which the measuring cable passes on to the cable drum 5. The shoe 114 is fixed to the housing 104, being in particular screwed thereto, and is so positioned that its lining consisting of the sliding band 111 has the desired contact with the external surface of the winding of measuring cable on the cable drum 5, as shown by the sectional view 2—2 in FIG. 20*a*.

It will be appreciated that the above-described embodiments of the invention have been set forth solely by way of example and illustration of the principles of the invention and that various other modifications and alterations may be made therein without thereby departing from the spirit and scope of the invention.

What is claimed is:

1. A measuring cable travel sensor, comprising:
    a housing,
    a cable drum,
    means mounting the cable drum in the housing rotatably and longitudinally displaceably in the longitudinal direction relative to the axis of drum rotation,
    a measuring cable adapted to be wound on to and unwound from the cable drum,
    a cable guide means for the measuring cable, arranged stationarily with respect to the housing,
    a longitudinal drive means for the cable drum including a spindle drive means comprising a screwthreaded spindle and a spindle nut screwable thereon,
    the longitudinal drive means including an additional transmission means for transmitting the rotational movement of the cable drum to the spindle drive means.

2. A measuring cable travel sensor as set forth in claim 1, including:
    means mounting the screwthreaded spindle in eccentric relationship with respect to the axis of rotation of the cable drum wherein the spindle is the outside the cable drum and in parallel relationship with the axis of rotation of the cable drum.

3. A measuring cable travel sensor as set forth in claim 1, wherein the transmission means comprises a belt transmission means, including a toothed belt transmission means, having a belt and a plurality of belt pulleys, a shaft which also rotates with the cable drum, and means easily replaceably mounting the belt pulleys on the screwthreaded spindle on the one hand and on the other hand on said shaft.

4. A measuring cable travel sensor as set forth in claim 3, wherein said shaft which also rotates with the cable drum is arranged in central relationship with the cable drum and has a non-round external periphery for directly or indirectly connecting same non-rotatably but longitudinally displaceably to the cable drum.

5. A measuring cable travel sensor as set forth in claim 4, wherein said shaft which rotates with the cable drum is in the form of a splined shaft.

6. A measuring cable travel sensor as set forth in claim 3, including:
    a carriage,
    means non-rotatably supporting the spindle nut of the spindle drive means in the carriage,
    means for displacement of said carriage along said shaft which rotates with the cable drum in the longitudinal direction, and
    means for rotatably and substantially axially fixedly supporting the cable drum in the carriage.

7. A measuring cable travel sensor as set forth in claim 6, and including:
    contact-free supporting means for axially supporting the cable drum in said carriage.

8. A measuring cable travel sensor as set forth in claim 7, wherein said contact-free supporting means comprise a permanent magnet means.

9. A measuring cable travel sensor as set forth in claim 3, and including:
    a return drive means for biassing the cable drum in the winding-on direction, a rotary angle sensor for detecting the rotational position of said cable drum, and means operatively connecting said return drive means and said rotary angle sensor to said shaft, in coaxial relationship thereon.

10. A measuring cable travel sensor as set forth in claim 9, wherein said return drive means and said rotary angle sensor are disposed at first and second mutually opposite ends of said shaft in separate spaces in a housing of said rotary angle sensor.

11. A measuring cable travel sensor as set forth in claim 10, wherein the return drive means is a flat spring means.

12. A measuring cable travel sensor as set forth in claim 11, wherein said flat spring means comprises a plurality of axially successively arranged flat springs which are disposed in mutually parallel planes and are so arranged and in particular are so operatively disposed in a series array that after time-wise stressing of the first spring of the array tightening of the next spring occurs.

13. A measuring cable travel sensor as set forth in claim 3, wherein said housing comprises a box member and end plate portions closing same at respective ends thereof, and wherein said shaft is supported in said end plate portions.

14. A measuring cable travel sensor as set forth in claim 1, wherein at least one of said spindle drive means and said additional transmission means is disposed within said housing in the same space in the housing as the cable drum.

15. A measuring cable travel sensor as set forth in claim 1, wherein said housing includes an internally angular box shaped portion which extends in the longitudinal direction of the measuring cable travel sensor, and end plate portions closing said box member at the ends.

16. A measuring cable travel sensor as set forth in claim 15, wherein said end plate portions are secured to said box member by screw means.

17. A measuring cable travel sensor as set forth in claim 15, wherein said box member has on the insides thereof inwardly open screw passages of an undercut configuration adapted to receive by screwing therein self-tapping screws from the end of the box member.

18. A measuring cable travel sensor as set forth in claim 15, wherein said screwthreaded spindle is supported in said end plate portions.

19. A measuring cable travel sensor according to claim 1, further including:

at least one braking magnet arranged at a point non-rotatable with said cable drum and adapted to act brakingly against the direction of rotation in contact-less manner magnetically on the cable drum at an eccentric region of action thereof, the cable drum at least in said region comprising electrically conductive material.

20. A measuring cable travel sensor as set forth in claim 19, wherein the braking magnet is arranged on said housing.

21. A measuring cable travel sensor as set forth in claim 19, wherein said at least one braking magnet is disposed at the largest possible spacing relative to the axis of rotation of the cable drum.

22. A measuring cable travel sensor as set forth in claim 21, wherein said at least one braking magnet is arranged in the proximity of the external periphery of the cable drum.

23. A measuring cable travel sensor as set forth in claim 19, wherein the at least one braking magnet is a permanent magnet.

24. A measuring cable travel sensor as set forth in claim 19, wherein the at least one braking magnet is arranged with its magnetisation axis parallel to the axis of rotation of the cable drum.

25. A measuring cable travel sensor as set forth in claim 19, including:

at least first and second braking magnets having their magnetisation axis parallel to the axis of rotation of the cable drum and being of opposite polarities.

26. A measuring cable travel sensor as set forth in claim 19, and including;

a magnetic holder for accommodating the at least one braking magnet, and means for adjusting the position of the magnet holder in the axial direction relative to the component to be steplessly magnetically influenced.

27. A measuring cable travel sensor as set forth in claim 26, wherein the magnet holder is a screwthreaded member carrying said braking magnet and directed towards said component.

28. A measuring cable travel sensor as set forth in claim 19, wherein said braking magnet is a disk-shaped magnet having a magnetisation axis corresponding to the thickness of the magnet.

29. A measuring cable travel sensor as set forth in claim 19, wherein said braking magnet is a disk-shaped magnet subdivided into sectors, wherein the individual sectors are operative as individual magnets whose magnetisation axes respectively correspond to the thickness of said disk-shaped magnet, the polarity of the individual sectors alternating along the periphery.

30. A measuring cable travel sensor as set forth in claim 19, wherein the braking magnet is a disk-shaped magnet having only one of its main faces magnetised by magnetisation alternating in a sector configuration in a peripheral direction.

31. A measuring cable travel sensor according to claim 1 further including:

at least one braking magnet arranged eccentrically at the cable drum such that it brakingly acts on the housing in the direction of rotation in contact-less mode magnetically, the housing at least in the region in which the magnet acts thereon comprising electrically conductive material.

32. A measuring cable travel sensor as set forth in claim 31, including:

at least a pair of braking magnets arranged on the cable drum in uniformly peripherally distributed array for avoiding unbalance on the cable drum.

33. A measuring cable travel sensor as set forth in claim 31, wherein the at least one braking magnet is a permanent magnet.

34. A measuring cable travel sensor as set forth in claim 31, including:
a plurality of braking magnets including pole pieces radially inwardly and radially outwardly of the magnetisation axis.

35. A measuring cable travel sensor as set forth in claim 34,
wherein each said pole piece is of a generally cup-shaped configuration which is open only towards the component to be magnetically influenced.

36. A measuring cable travel sensor as set forth in claim 31, and including:
a magnetic holder for accommodating the at least one braking magnet, and
means for adjusting the position of the magnet holder in the axial direction relative to the component to be steplessly magnetically influenced.

37. A measuring cable travel sensor as set forth in claim 36,
wherein the magnet holder is a screwthreaded member carrying said holding magnet and directed towards said component.

38. A measuring cable travel sensor as set forth in claim 31,
wherein mutually facing magnets are arranged in alignment in the longitudinal direction as braking magnets in opposite relationship on both sides of the cable drum facing towards each other with opposite poles in the longitudinal direction.

39. A measuring cable travel sensor as set forth in claim 31,
wherein said braking magnet is a disk-shaped magnet having a magnetisation axis corresponding to the thickness of the magnet.

40. A measuring cable travel sensor as set forth in claim 31,
wherein said braking magnet is a disk-shaped magnet subdivided into sectors, wherein the individual sectors are operative as individual magnets whose magnetisation axes respectively correspond to the thickness of said disk-shaped magnet, the polarity of the individual sectors alternating along the periphery.

41. A measuring cable travel sensor as set forth in claim 31,
wherein the braking magnet is a disk-shaped magnet having only one of its main faces magnetised by magnetisation alternating in a sector configuration in a peripheral direction.

42. A measuring cable travel sensor as set forth in claim 31, and further including:
at least one holding magnet operable to hold the measuring cable radially inwardly to said winding surface, the at least one braking magnet and the at least one holding magnet being functionally combined in a respective combination magnet.

43. A measuring cable travel sensor according to claim 1, said cable drum including a winding cylinder portion and said sensor further including:
at least one holding magnet on the cable drum radially within a winding surface of said winding cylinder portion, and operable to hold said measuring cable radially inwardly to said winding surface,
the measuring cable comprising at least in part magnetisable material.

44. A measuring cable travel sensor as set forth in claim 43, including:
at least a pair of holding magnets arranged on the cable drum in uniformly peripherally distributed array for avoiding unbalance on the cable drum.

45. A measuring cable travel sensor as set forth in claim 43,
wherein the at least one holding magnet is a permanent magnet.

46. A measuring cable travel sensor as set forth in claim 43,
wherein said at least one holding magnet has its axis of magnetisation arranged parallel to the axis of rotation of the cable drum.

47. A measuring cable travel sensor as set forth in claim 43, and including:
a magnetic holder for accommodating the at least one holding magnet, and
means for adjusting the position of the magnet holder in the axial direction relative to the component to be steplessly magnetically influenced.

48. A measuring cable travel sensor according to claim 1, further including:
a sliding band extending around at least a part of the periphery of a winding surface of said cable drum at most a small spacing therefrom, and
means for adjusting the spacing of said band relative to the winding of measuring cable on said winding surface.

49. A measuring cable travel sensor as set forth in claim 48,
wherein said band comprises textile material.

50. A measuring cable travel sensor as set forth in claim 48,
wherein said band comprises slidable non-abrasive material.

51. A measuring cable travel sensor as set forth in claim 48,
wherein said band is passed around said winding surface in lightly rubbing relationship with the measuring cable at the outside periphery of the winding thereof.

52. A measuring cable travel sensor as set forth in claim 48,
wherein the adjusting means are also adapted to adjust a contact pressure of said band against said measuring cable on said winding surface.

53. A measuring cable travel sensor, comprising:
a housing,
a cable drum,
a retaining mount which rotatably fixes the cable drum in the housing and longitudinally displaces the cable drum in the longitudinal direction relative to the axis of drum rotation,
a measuring cable adapted to be wound on to and unwound from the cable drum,
a cable guide arranged stationarily with respect to the housing, and
a longitudinal drive for the cable drum including a spindle drive comprising a screwthreaded spindle and a spindle nut screwable thereon,
the longitudinal driver including an additional rotational movement unit for transmitting the rotational movement of the cable drum to the spindle drive.

* * * * *